United States Patent
Vicci et al.

(10) Patent No.: US 7,305,319 B2
(45) Date of Patent: Dec. 4, 2007

(54) METHODS AND SYSTEMS FOR THREE-DIMENSIONAL MOTION CONTROL AND TRACKING OF A MECHANICALLY UNATTACHED MAGNETIC PROBE

(75) Inventors: Leandra Vicci, Siler City, NC (US); Richard Superfine, Chapel Hill, NC (US)

(73) Assignee: The University of North Carolina, Chapel Hill, NC (US)

( * ) Notice: Subject to any disclaimer, the term of this patent is extended or adjusted under 35 U.S.C. 154(b) by 0 days.

(21) Appl. No.: 10/487,860

(22) PCT Filed: Sep. 30, 2002

(86) PCT No.: PCT/US02/30853

§ 371 (c)(1),
(2), (4) Date: Jul. 15, 2004

(87) PCT Pub. No.: WO03/029921

PCT Pub. Date: Apr. 10, 2003

(65) Prior Publication Data

US 2004/0244470 A1 Dec. 9, 2004

Related U.S. Application Data

(60) Provisional application No. 60/326,530, filed on Sep. 28, 2001.

(51) Int. Cl.
*G01C 9/00* (2006.01)
(52) U.S. Cl. .......................... 702/152; 702/23; 702/31; 702/95
(58) Field of Classification Search ................ 702/152, 702/95
See application file for complete search history.

(56) References Cited

U.S. PATENT DOCUMENTS

| | | | | |
|---|---|---|---|---|
| 4,408,277 A | * | 10/1983 | Cortellini et al. ............ | 345/419 |
| 5,206,504 A | * | 4/1993 | Sridharan .................... | 250/251 |
| 5,638,303 A | * | 6/1997 | Edberg et al. ............... | 700/302 |
| 5,698,843 A | * | 12/1997 | Phak ........................ | 250/206.2 |
| 6,162,364 A | * | 12/2000 | Tillotson et al. ............ | 210/695 |

(Continued)

OTHER PUBLICATIONS

Commonly-assigned, co-pending U.S. Appl. No. 10/786,427 for "Methods and Systems for Three-Dimensional Motion Control and Tracking of a Mechanically Unattached Probe," (Unpublished, filed Feb. 25, 2004).

(Continued)

*Primary Examiner*—John Barlow
*Assistant Examiner*—Jonathan Moffat
(74) *Attorney, Agent, or Firm*—Jenkins, Wilson, Taylor & Hunt, P.A.

(57) ABSTRACT

Methods and systems for controlling motion of and optically tracking a mechanically unattached probe (202) in three-dimensions are disclosed. A mechanically unattached magnetic probe (202) is placed in the system under test. The position of the probe is optically tracked in three dimensions by sensing light scattered by the probe and direct light from a light source. Magnetic poles (200) positioned about the probe are selectively magnetized to control motion of the probe in three dimensions by minimizing error between a sensed position and a desired position. In one implementation, the coil currents are time division multiplexed such that the average force on the probe produces motion in a desired direction.

52 Claims, 13 Drawing Sheets

U.S. PATENT DOCUMENTS

| | | | |
|---|---|---|---|
| 6,269,324 B1* | 7/2001 | Rakijas et al. | 702/190 |
| 6,442,416 B1* | 8/2002 | Schultz | 600/429 |
| 6,470,226 B1* | 10/2002 | Olesen et al. | 700/56 |
| 6,549,004 B1* | 4/2003 | Prigge | 324/207.17 |
| 6,596,076 B1* | 7/2003 | Wakayama | 117/68 |
| 6,716,642 B1* | 4/2004 | Wu et al. | 436/518 |

OTHER PUBLICATIONS

Lee et al., "Microelectromagnets for the Control of Magnetic Nanoparticles," Applied Physics Letters, vol. 79, No. 20, pp. 3308-3310 (Nov. 12, 2001).

Choi et al., "An On-Chip Magnetic Bead Separator Using Spiral Electromagnets with Semi-Encapsulated Permalloy," Biosensors & Bioelectronics 16, pp. 409-416 (2001).

Choi et al., "A New Magnetic Bead-Based, Filterless Bio-Separator with Planar Electromagnet Surfaces for Integrated Bio-Detection Systems," Sensors and Actuators B 68, pp. 34-39 (2000).

Ahn et al., "Micromachined Planar Inductors on Silicon Wafers for MEMS Applications," IEEE Transactions on Industrial Electronics, vol. 45, No. 6, pp. 866-876 (Dec. 1998).

Drndić et al., "Micro-Electromagnets for Atom Manipulation," Applied Physics Letters, vol. 72, No. 22, pp. 2906-2908 (Jun. 1, 1998).

Ahn et al., "A Fully Integrated Micromachined Magnetic Particle Separator," Journal of Microelectromechanical Systems, vol. 5, No. 3, pp. 151-158 (Sep. 1996).

Ahn et al., "A Fully Integrated Planar Torodial Inductor with a Micromachined Nickel-Iron Magnetic Bar," IEEE Transactions on Components, Packaging, and Manufacturing Technology-Part A, vol. 17, No. 3, pp. 463-469 (Sep. 1994).

* cited by examiner

METHODS AND SYSTEMS FOR THREE-DIMENSIONAL MOTION CONTROL AND TRACKING OF A MECHANICALLY UNATTACHED MAGNETIC PROBE

PRIORITY APPLICATIONS

This application claims the benefit of U.S. Provisional Patent Application No. 60/326,530, filed Sep. 28, 2001, the disclosure of which is incorporated herein by reference in its entirety.

GRANT STATEMENT

This work was supported by NIH Grant Number P41 RR02170-17. Thus, the U.S. Government has certain rights to this invention.

TECHNICAL FIELD

The present invention relates to methods and systems for three-dimensional motion control and tracking of a mechanically unattached probe. More particularly, the present invention relates to methods and systems for magnetically controlling the motion of a mechanically unattached probe in three dimensions while optically tracking the probe in three dimensions.

BACKGROUND ART

In the field of scanning probe microscopy, small probes interact with systems under test to measure mechanical properties of the systems under test. For example, in atomic force microscopy, a small probe (typically sub-micrometer sized) is attached to the end of a cantilever. As the probe is scanned across the surface of a system under test, such as the membrane of a cell, surface irregularities impose a varying force on the probe, which, in turn, in a bending or deflection of the cantilever. An optical sensor senses the deflection of the cantilever based on light reflected from the cantilever and thereby determines changes in normal position of the probe as it is scanned across the surface of the system under test. The changes in normal position of the probe are used to map the surface of the system under test.

FIG. 1A illustrates a typical application of atomic force microscopy. In FIG. 1A, a probe 100 is attached to the end of cantilever 102 to map the surface 104 of a cell membrane. A laser, an optical sensor, and a computer (not shown) are used to map surface 104 as probe 100 causes deflections in cantilever 102. One problem with atomic force microscopy is illustrated in FIG. 1B. Atomic force microscopy requires a mechanical connection between probe 100 and the remainder of the system via cantilever 102. As a result, conventional atomic force microscopy is unsuitable for measuring mechanical properties of structures within enclosed regions, such as organelles within a cell membrane, or the other structures that are inaccessible for scanning with a mechanically attached probe.

One way to measure properties of structures inside of cells and other enclosed environments, is to mechanically decouple the probe from the remainder of the system. However, once the probe is mechanically decoupled from the remainder of the system, tracking and controlling movement of the probe become problematic. One known technique of applying force to a mechanically decoupled probe is referred to as "optical tweezers." This technique requires high optical field intensities that interact strongly with many materials and may produce undesirable side effects on experiments in biological systems.

Magnetic techniques have also been developed for moving probes in two dimensions. However, methods and systems for three dimensional motion control and tracking of a free-floating particle, prior to the present invention, are not known to be developed. Such a motion control and tracking system would be particularly useful for measuring mechanical properties of living organisms in biological environments and in materials science. Accordingly, there exists a long felt need for methods and systems for three dimensional motion control and tracking of a mechanically unattached, free-floating probe.

DISCLOSURE OF THE INVENTION

The present invention includes methods and systems for three dimensional motion control and tracking of a mechanically unattached probe. By mechanically unattached, it is meant that the probe is not mechanically attached to its motion control system. The present invention is not limited to controlling the motion of a probe that is not mechanically attached to anything. For example, a probe may be bound with weak forces to a surface of a sample under test and be allowed to diffuse on the surface. In another example, a probe may be bound to the surface of a system under test and forces may be applied to the probe in a direction normal to the surface to measure the forces that bind the probe.

According to one aspect of the invention a plurality of magnetic poles are geometrically arranged with respect to each other and with respect to a magnetic probe for applying magnetic force to the probe and controlling motion of the probe in three dimensions. At least one magnetizing coil is coupled to the magnetic poles for generating the magnetic force on the probe through the poles. An optical tracker tracks the position of the probe in three dimensions while the probe is moving in three dimensions. A controller measures the error between the position of the probe and a position control signal and energizes the coils to move the probe in three dimensions and minimize the error.

Because the methods and systems of the present invention are capable of simultaneously controlling the motion of and tracking a magnetic probe in three dimensions, the mechanical properties of structures within enclosed and other hard-to-reach environments can be determined with minimal disturbance of the environments.

Accordingly, it is an object of the invention to provide methods and systems for magnetically controlling motion of and optically tracking a mechanically unattached magnetic probe in three dimensions.

It is another object of the invention to provide methods and systems for magnetically controlling motion of and optically tracking a mechanically unattached magnetic probe in three dimensions that reduce the disturbance of the system under test.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1A:
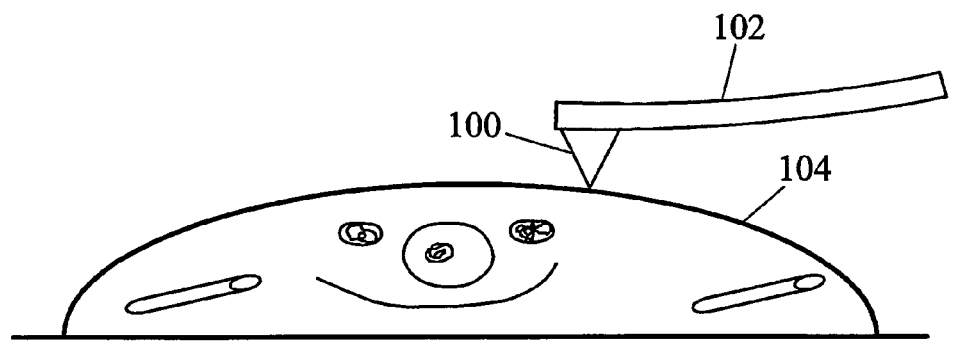
FIGS. 1A and 1B are sectional views of a biological cell and a probe associated with conventional atomic force microscopy techniques.
Figure 1B:
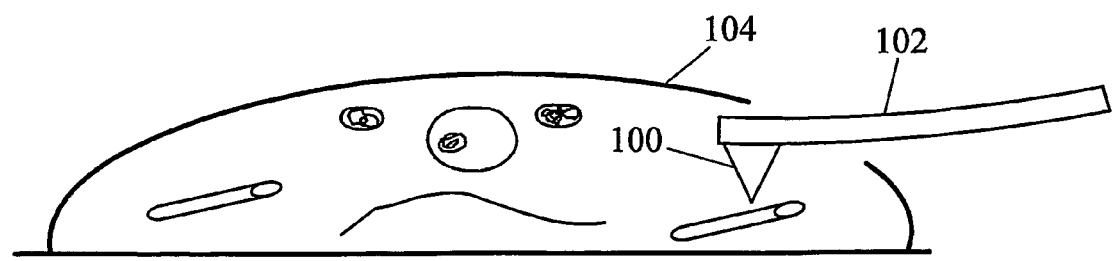
Figure 2:
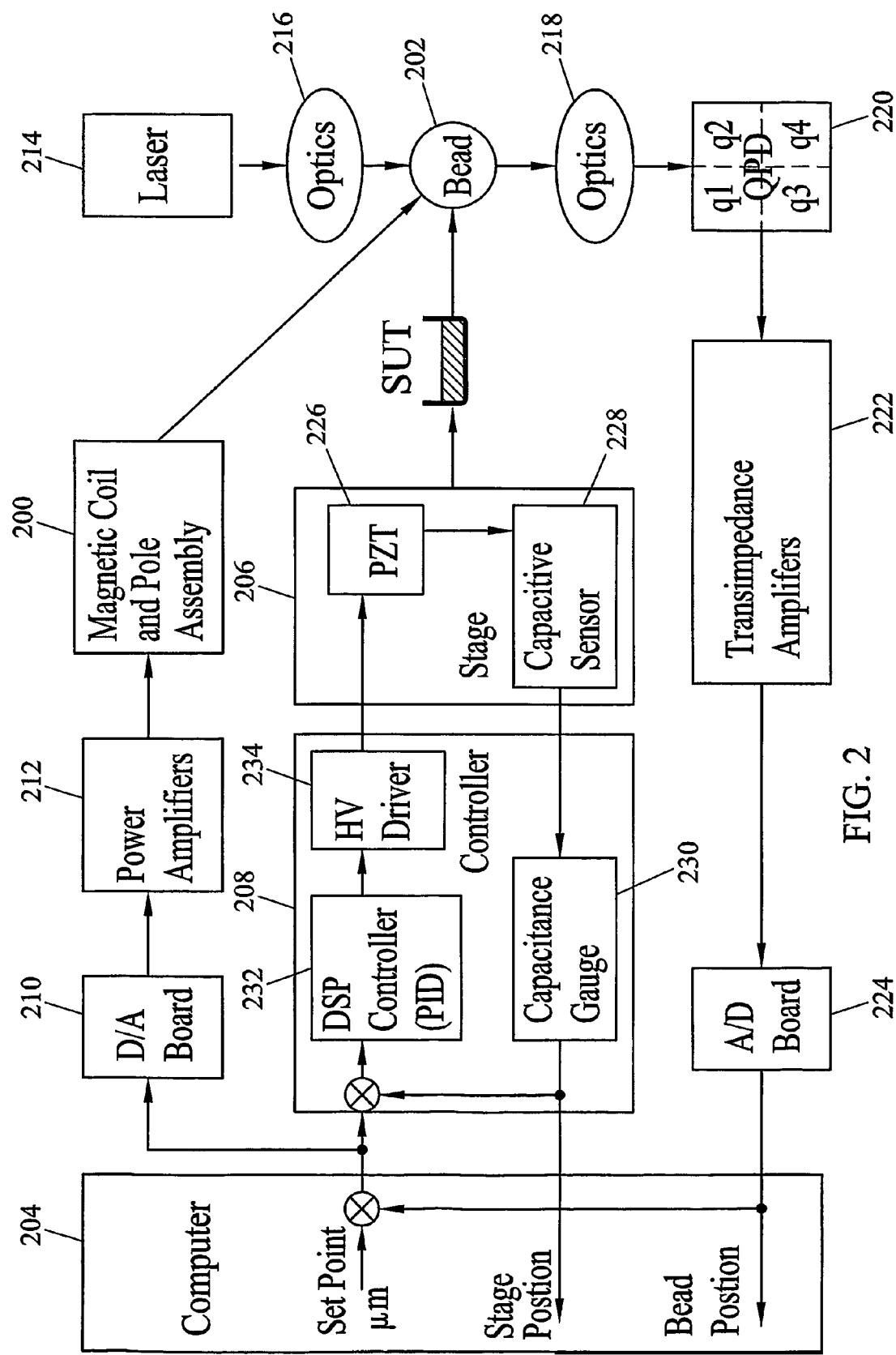
FIG. 2 is a block diagram of a three-dimensional force microscope instrument including a system for three-dimensional motion control and tracking of a mechanically unattached magnetic probe according to an embodiment of the present invention.

The methods and systems for three-dimensional motion control and tracking of a mechanically unattached magnetic probe according to embodiments of the present invention are particularly well suited for 3D force microscopy. FIG. 2 illustrates exemplary components of a system for three-dimensional motion control and tracking of a mechanically unattached magnetic probe in a 3D force microscopy application according to an embodiment of the present invention. Referring to FIG. 2, the system includes magnetic coil and pole assembly 200 for controlling the position of a mechanically unattached magnetic bead or probe 202. The magnetic force supplied by assembly 200 is controlled by a computer 204. More particularly, computer 204 receives as inputs a desired position set point, measured bead position, and position of a stage 206. Computer 204 implements a control algorithm that selects the poles that should be magnetized and the corresponding magnetizing currents to minimize the error between the actual and desired position of bead 202. A controller 208 measures the position of stage 206 and moves stage 206 to minimize the error between an actual and desired position of stage 206 output from computer 204. A D/A board 210 converts the digital coil control signal output from computer 204 into analog format. Power amplifiers 212 amplify the signal output from D/A board 210 and output the amplified signals to magnetic coil and pole assembly 200 as pole magnetizing currents.

In order to image and track bead 202, the system illustrated in FIG. 2 includes various optical components. These components include laser 214, optics 216, and optics 218. Laser 214 generates light to be scattered from bead 202 and used to track bead 202. Optics 216 includes a series of lenses used for both tracking and imaging. Optics 218 collect light scattered by bead 202, light scattered by the system being monitored, and light transmitted directly from laser 214. A quadrant photodiode 220 converts the light collected by optics 218 into electronic signals used to determine the bead position. Transimpedance amplifiers 222 convert the currents output by diode 220 into voltages indicative of the bead position. An A/D board 224 converts the voltages output from transimpedance amplifiers 222 into digital signals indicative of the bead position.

In order to continuously track the position of bead 202 while bead 202 is moving, bead 202 must remain within the beam waist of laser 214 at the focus of optics 216. In order to keep bead 202 within the beam waist of laser 214, stage 206 includes a piezoelectric transducer 226 and a capacitive sensor 228. Piezoelectric transducer 226 controls the x-y position of stage 206. Capacitive sensor 228 senses the displacement produced by piezoelectric transducer 226 and outputs a signal indicative of the displacement to a capacitance gauge 230 in controller 208. Controller 208 includes a feedback control loop consisting of a PID controller 232, a high-voltage driver 234, and capacitance gauge 230 in order to minimize the error and reduce instability in controlling the position of stage 206 as bead 202 is moved.

Figure 3:
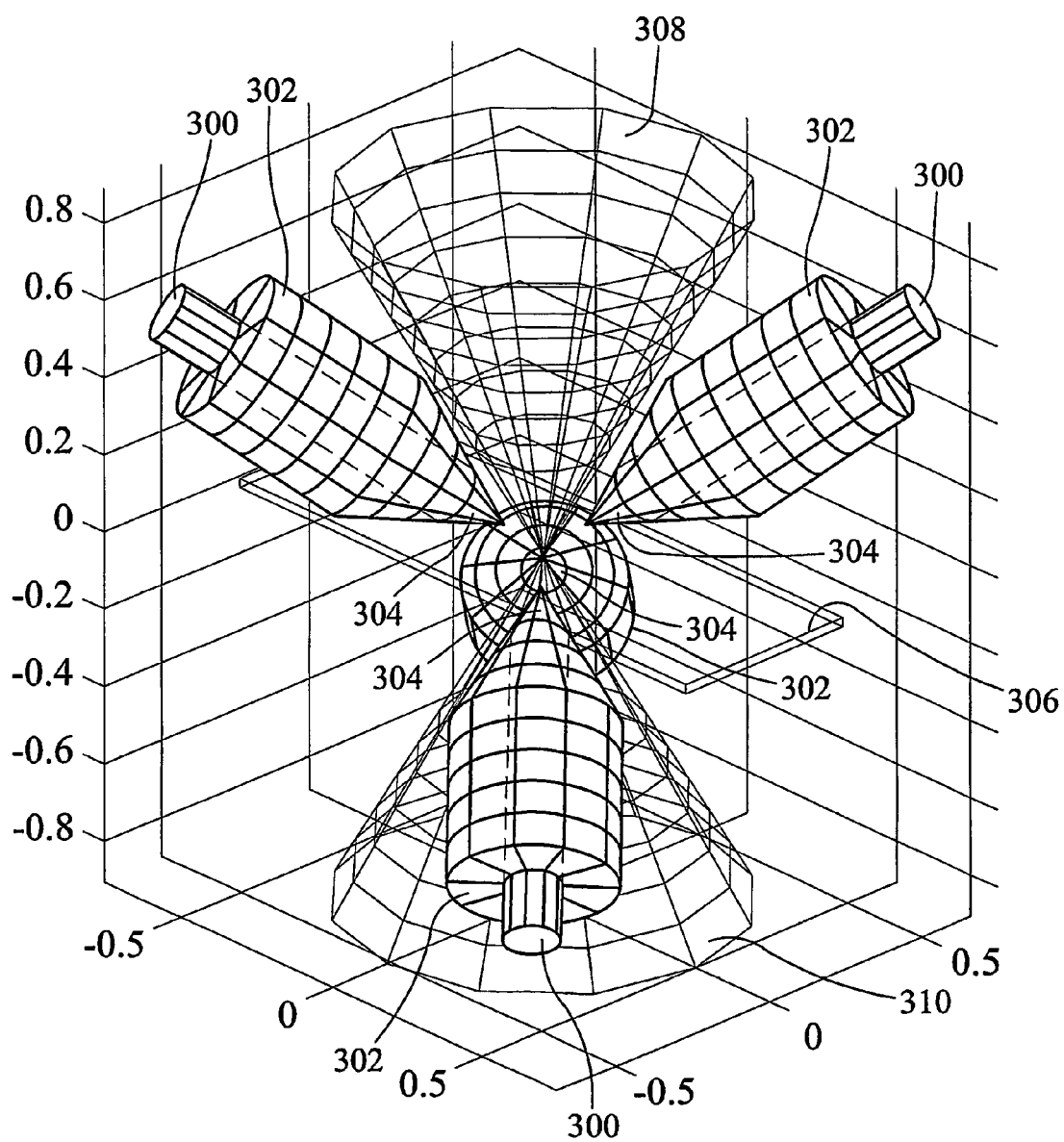
FIG. 3 is a perspective view of a conceptual design for poles, magnets, and optics of a system for three-dimensional motion control and tracking of a mechanically unattached magnetic probe according to an embodiment of the present invention.

FIG. 3 is a schematic diagram illustrating an exemplary conceptual design for magnetic coil and pole assembly 200 illustrated in FIG. 2. Referring to FIG. 3, assembly 200 includes a plurality of magnetic poles 300 and plurality of magnetic coils or shells 302. In the illustrated embodiment, assembly 200 includes four poles 300. In a fixed configuration, four is the minimum number of poles for controlling motion of bead 202 in three dimensions. Poles 300 preferably include tapered ends 304 positioned close to the bead in order to provide a high-intensity magnetic field and to reduce leakage flux. Poles 300 are preferably connected by a high permeability shell (not shown) to provide a magnetic flux return path for each pole through the other poles.

In FIG. 2, the design for assembly 200 is symmetric in that poles 300 converge from the vertices of a virtual equalateral tetrahedron towards its center. This geometry is fortuitous in that there are three orthogonal lines passing through the center of assembly 200, each having the maximum possible angular separation from the closest pole. This design conveniently provides an optical axis normal to a plane for a slide 306 holding the sample under test. Cones 308 and 310 illustrate available space for system optics in the symmetric four-pole design.

While the design illustrated in FIG. 3 is ideal that it includes a minimum possible number of poles and is symmetric, in practice, the poles and their associated cores compete with system optics and sample holding mechanics for space. One method for solving this problem is to develop customized optics that fit within cones 308 and 310 illustrated in FIG. 3. Another method for solving this problem is to vary the orientation of poles 300 to accommodate commercially available optics. Either method for designing assembly 200 is intended to be within the scope of the invention.

Figure 4:
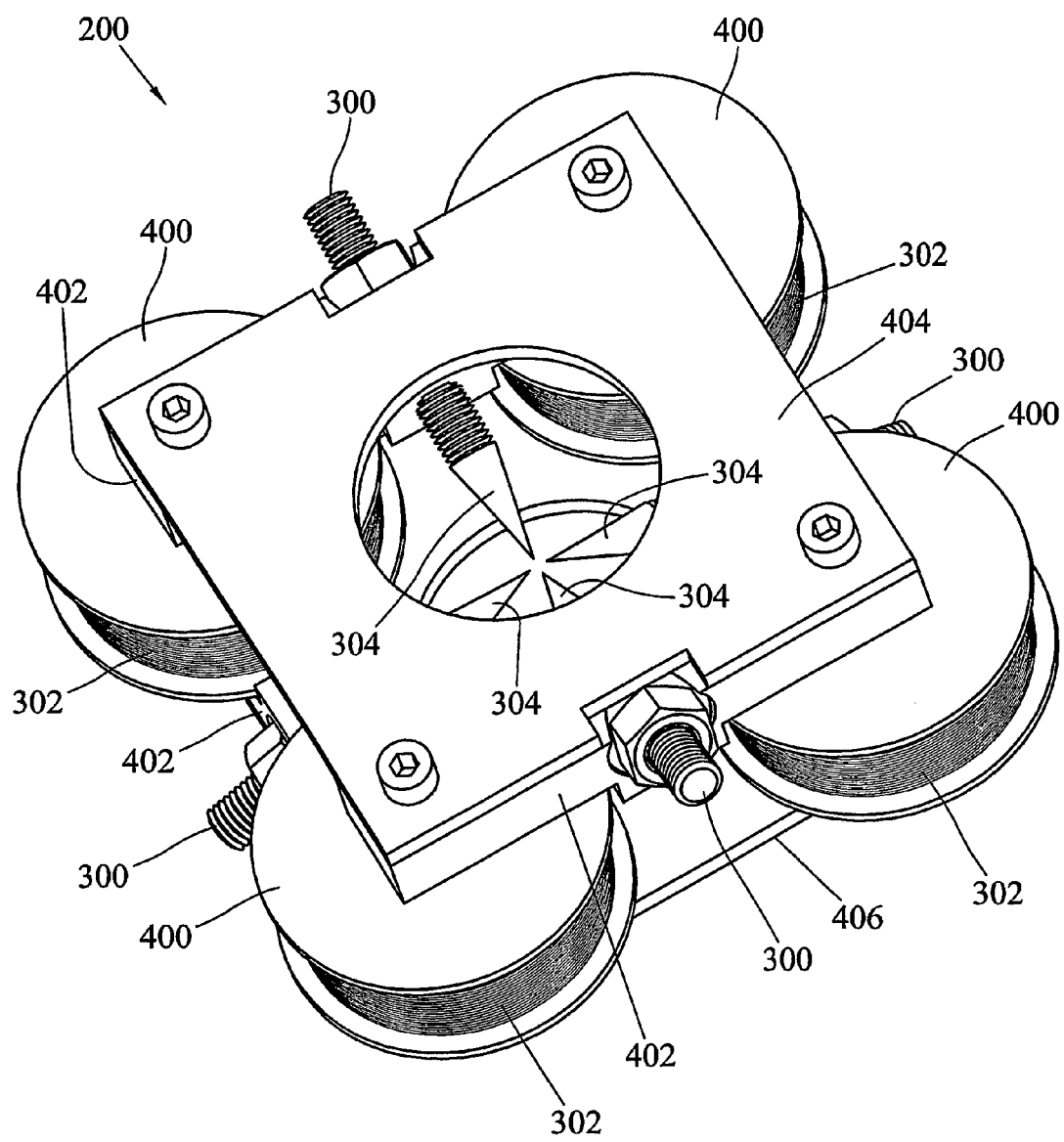
FIG. 4 is a top perspective view of a magnetic coil and pole assembly of a system for three-dimensional motion control and tracking of a mechanically unattached magnetic probe according to an embodiment of the present invention.

FIG. 4 is a perspective top view of assembly 200 in which the orientations of poles 300 and coils 302 are modified to accommodate commercially available optics. Referring to FIG. 4, assembly 200 includes four poles 300 as in the ideal design illustrated in FIG. 3. However, rather than having coils that surround poles 300 as in FIG. 3, in FIG. 4, coils 302 are wound around bobbins 400 and are magnetically coupled to poles 300 via magnetic cross pieces 402. Moving coils 302 from poles 300 increases the available space for system optics. Assembly 200 illustrated in FIG. 4 includes upper and lower cover plates 404 and 406, each including an aperture to provide an optical through path through the sample and to hold the imaging and tracking optics.

Figure 5:
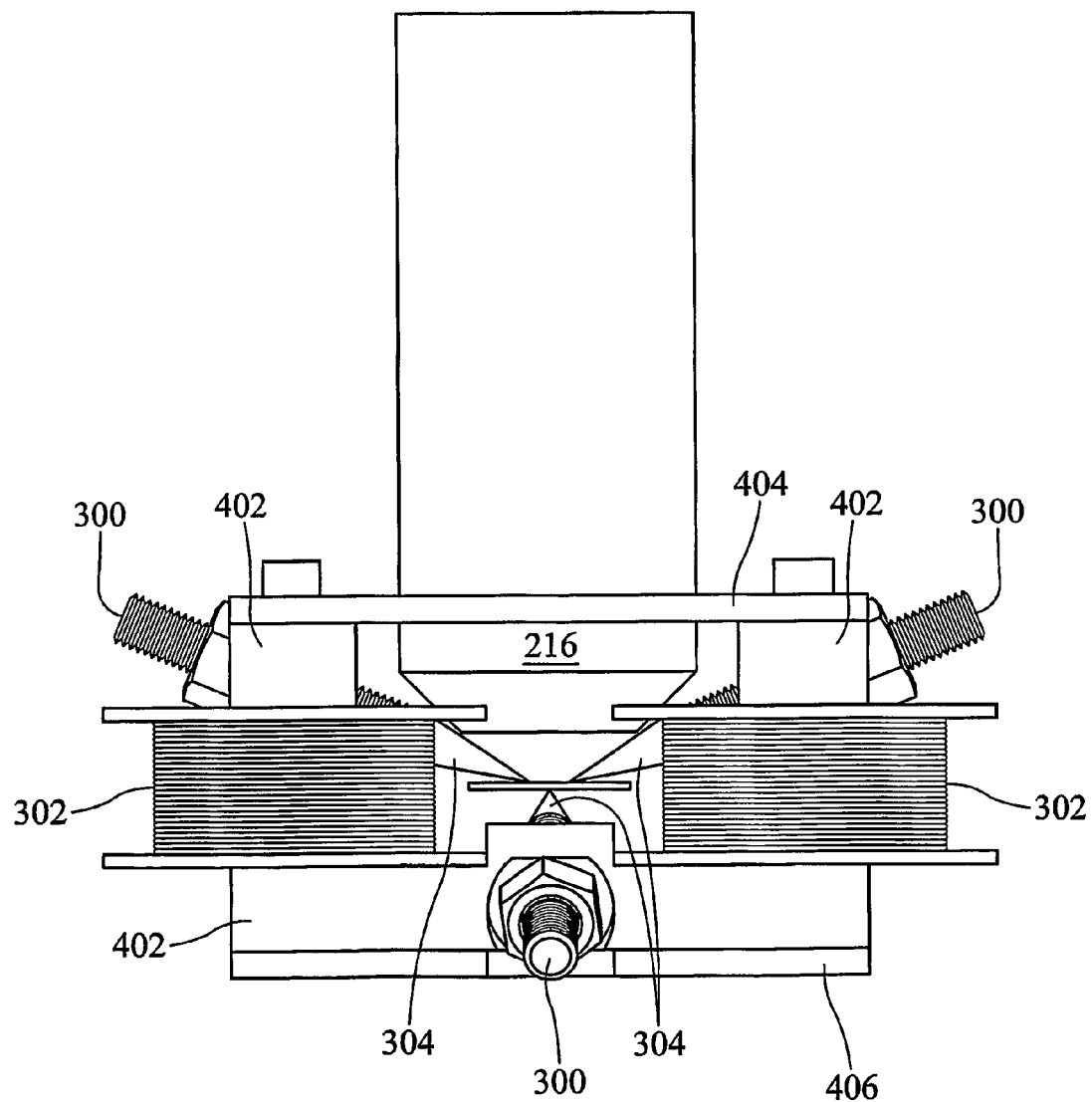
FIG. 5 is a side view of a magnetic coil and pole assembly and associated optics of a system for three-dimensional motion control and tracking of a mechanically unattached magnetic probe according to an embodiment of the present invention.

FIG. 5 is side view of assembly 200 illustrating poles 300, magnetic coils 302, magnetic cross pieces 402, and upper system optics 216 in more detail. Referring to FIG. 5, poles 300 and coils 302 are interconnected by magnetic cross pieces 402. Cross pieces 402 are preferably made of a magnetic material to provide a return path for magnetic flux through coils 302. Upper system optics 216 includes a lens assembly positioned through the aperture in top plate 404 to allow the imaging tracking optics to view and track the position of the bead.

Figure 6:
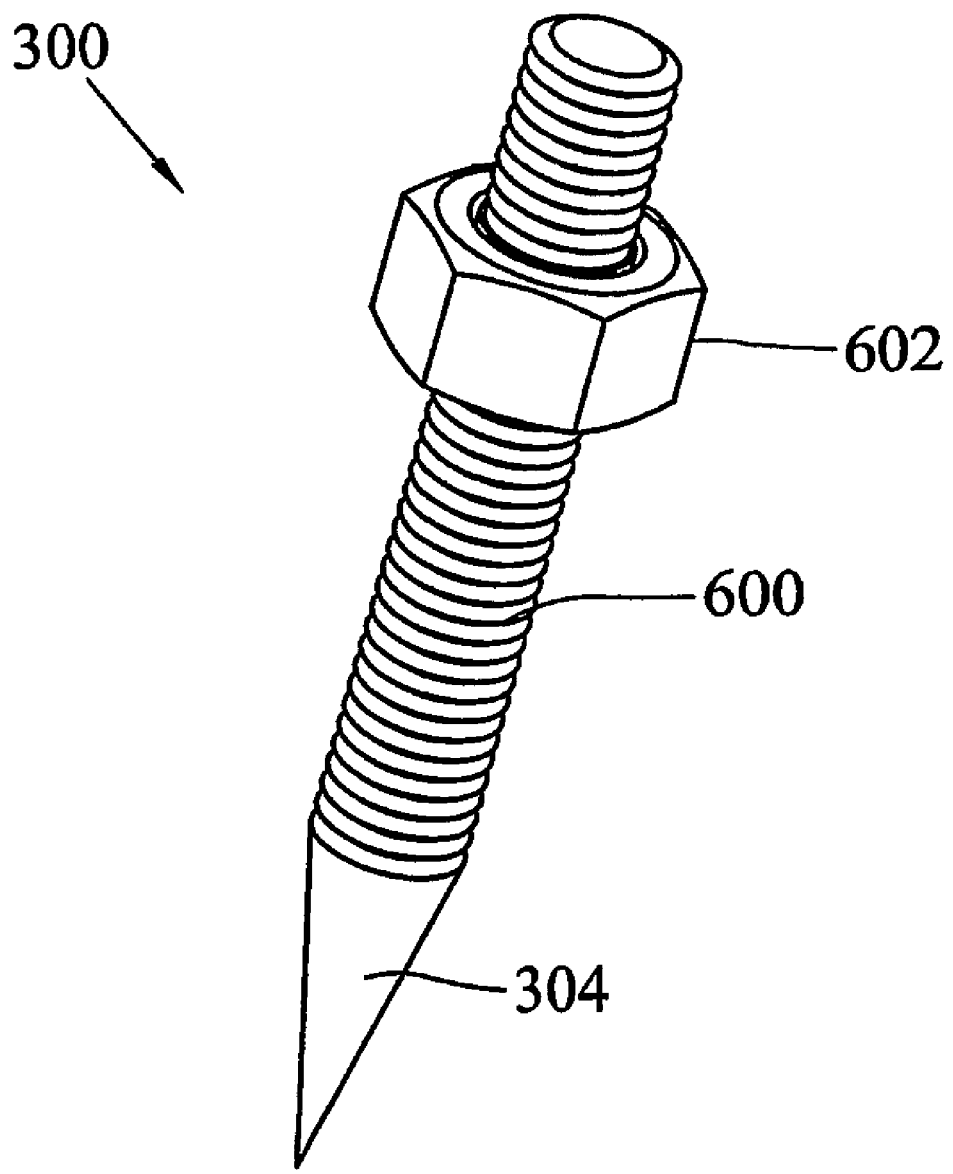
FIG. 6 is a perspective view of a pole suitable for use in a system for three-dimensional motion control and tracking of a mechanically unattached magnetic probe according to an embodiment of the present invention.

FIG. 6 is a perspective view of a pole 300 suitable for use in assembly 200 according to an embodiment of the present invention. In FIG. 6, pole 300 comprises a cylindrical elongate member with a tapered end 304. In the illustrated example, pole 300 includes a threaded region 600 and a jam nut 602 that allows the radial position of the pole to be adjusted with respect to the system under test.

Figure 7:
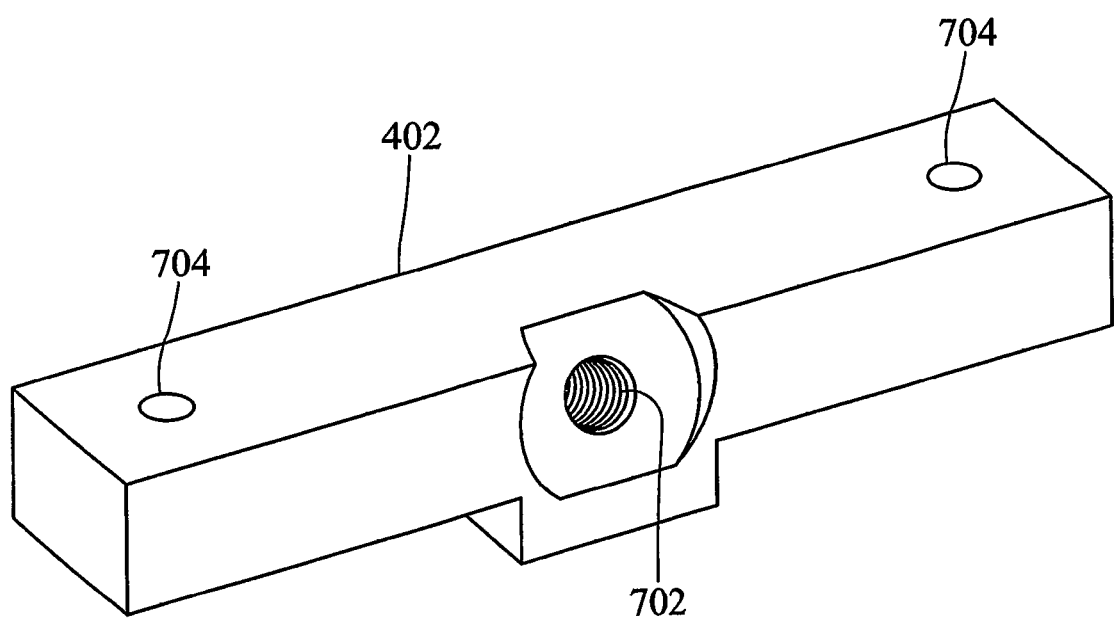
FIG. 7 is a perspective view of a magnetic cross piece suitable for use in a system three-dimensional motion control and tracking of a mechanically-unattached magnetic probe according to an embodiment of the present invention.

FIG. 7 is a perspective view of a magnetic cross piece suitable for use in assembly 200 according to an embodiment of the present invention. In FIG. 7, magnetic cross piece 402 comprises an elongate member with a central aperture 702 for receiving a pole 300. Aperture 702 is preferably threaded to allow radial adjustment of poles 300. Magnetic cross piece 402 also includes end apertures 704 for receiving through bolts that pass through the centers of the bobbins 400.

Figure 8A:
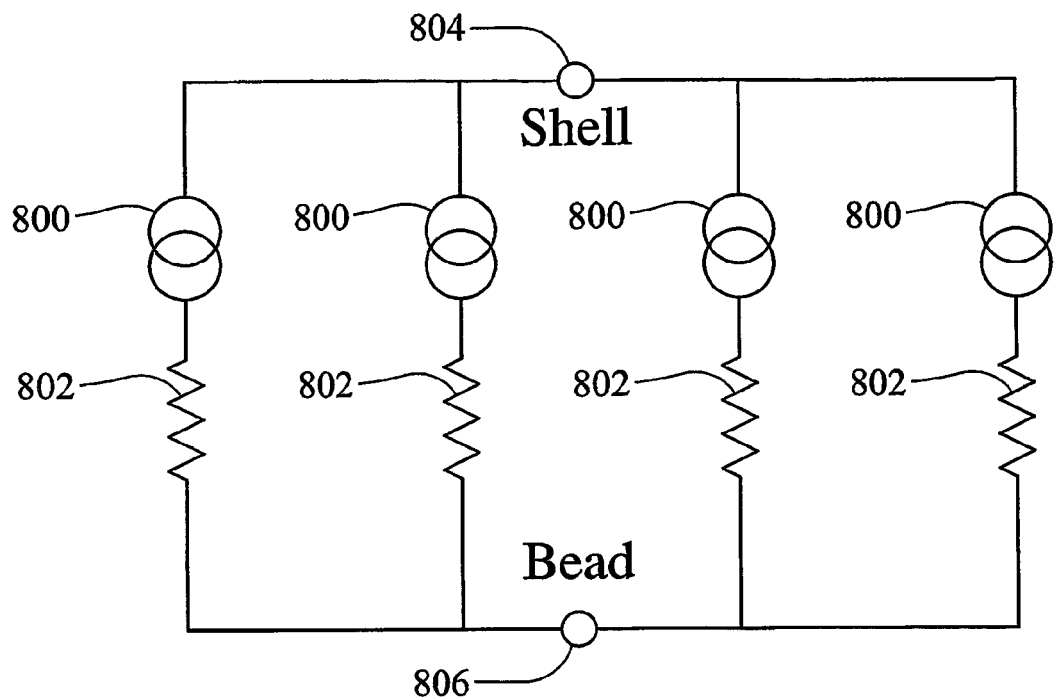
FIGS. 8A and 8B are magnetic circuit diagrams for a magnetic coil and pole assembly of a system for three-dimensional motion control and tracking of a mechanically unattached magnetic probe according to an embodiment of the present invention.
Figure 8B:
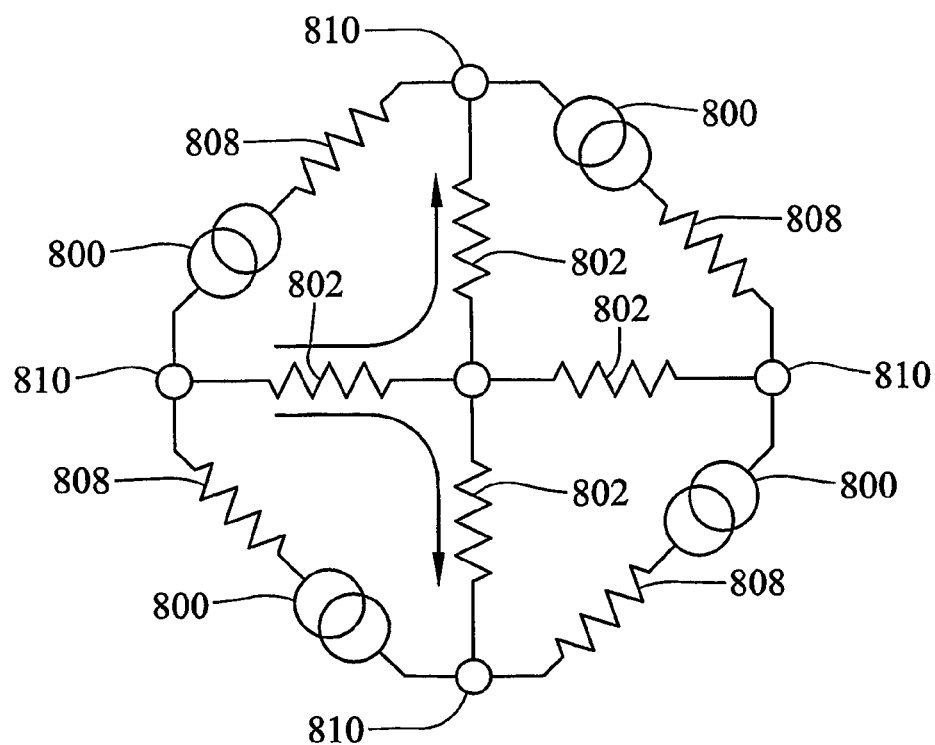

FIGS. 8A and 8B are equivalent magnetic circuit diagrams of the coil and pole assemblies illustrated in FIGS. 3 and 4, respectively. Referring to FIG. 8A, in the conceptual design, each pole is represented by a magnetomotive force (MMF) 800 connected in series with a reluctance 802. Reluctances 802 each represent the reluctance of the pole core itself and the air gap between the pole tip and the location of the bead. The conceptual design has two nodes, 804 and 806, representing the magnetic shell and the bead, respectively.

Referring to FIG. 8B, in the actual design, each pole is driven by two MMFs 800 in parallel. Reluctances 808 represent the reluctance of the cross pieces connecting the poles. Reluctances 802 represent the combined reluctances of each pole and the air gap between the pole and the bead. The design illustrated in FIG. 8B has four back-end nodes 810 which represent the pole pieces in the actual design.

In operation, when two of the magnetic coils are energized to magnetize a pole, the MMF on the pole is approximately the average of the MMFs connected to its back-end node 810. The arrows in FIG. 8B illustrate an exemplary path for magnetic flux when driving one of the poles. The return path for the magnetic flux is provided by adjacent undriven poles and the cross pieces or back-end nodes connecting these poles to the pole being driven.

Core Materials

Materials chosen for the poles and cross pieces are preferably of high relative permeability $\mu_r$. In addition, the air gaps near the pole tips are preferably minimized and uniform because a large gap decreases the magnetic field produced on the sample. Since any air gaps can reduce the magnetic field, it is desirable to minimize air gaps in the design.

In addition to high relative permeability, high core saturation is also important in order to maximize magnetic flux at the pole tips. Given a total flux $\phi_m$, the magnetic flux density B varies inversely with pole core cross-sectional area. For high flux, the magnetic flux density will exceed the saturation magnetic flux density of the core of each pole $$B_{sat}^{core}$$

at some place in the taper where the area becomes too small. The magnetic flux density at the tip is limited by $$B_{sat}^{core}.$$

Excess flux escapes from the sides of the taper in each core in the saturated parts of the tip. Increasing the MMF merely moves the saturation point back up the taper.

The highest saturation materials currently available are vanadium permendur and hyperco, both of which are not only expensive, but extremely difficult to fabricate. A good comprise is ASTM A828 magnetic iron, which saturates at about 1.6 Teslas. Yet another problem associated with core design is the fact that cores are typically made from conductive materials. According to Faraday's Law, changes in the magnetic flux density induce voltage gradients and consequently cause eddy currents in the pole cores. The more rapid the magnetic flux density changes, the greater the induced eddy currents. This limits the bandwidth over which the pole cores are operational. One method for reducing eddy currents is laminating thin sheets of the material to make up the pole cores or to mix a powder of the material with a nonconductive binder and cast the cores. Another possibility for reducing eddy currents is to formulate the cores of a class of materials referred to as Metglas®. These materials are metals formed as an amorphous solid rather than a crystalline solid by a process of hyper-fast chilling of the metal from the molten state. Magnetic alloys, such as mumetal, are commercially produced as Metglas® with very good properties. Such materials may improve the saturation characteristics of the cores. Using any of these or other materials to reduce eddy currents in the cores and allow the core to be operated at higher frequencies is intended to be within the scope of the invention.

Rather than choosing expensive materials, the cores according to the present embodiment were formulated of ASTM A 848 magnetic iron. In order to reduce eddy currents, the driving current was operated at a low frequency. For example, the driving current was operated in the range of about zero Hertz (DC) to no more than about tens of Hertz. However, the present invention is not limited to operating the magnetic core and pole assembly using driving currents limited to tens of Hertz. If magnetic materials with reduced conductivity are used, higher frequency driving currents may be used.

The present invention is not limited to using iron core magnetic poles. In an alternate embodiment of the invention, the magnetic poles may be made using microfabricated films or thin foils.

Potential Limitation on Degrees of Freedom

In the design for magnetic coil and pole assembly 200 illustrated in FIGS. 3-5, four poles are used to provide forces on the bead in three dimensions. However, the idea that pole strengths sum to zero is a constraint that mathematically nullifies one degree of freedom for motion within some spaces within the volume defined by poles 300. Instances in which this mathematical phenomenon occurs are when one tries to calculate a set of drive currents that will pull a bead in a direction exactly half way between two poles or in a direction opposite one of the poles. However, in practice, it was discovered that there are significant parasitic reluctances not shown in FIGS. 8A and 8B due to leakage flux between the various parts of the cores connecting the back-end nodes and parts of the pole cores themselves. These parasitic reluctances mitigate some of the effects of the inability to mathematically calculate drive currents that do not provide three degrees of freedom in some spaces within the volume defined by the poles. In addition, as will be described in detail below, time division multiplexing of the coil currents can be used such that a time average force on the bead causes the bead to move in a direction half way between two poles and even away from one pole in four-pole geometry. Thus, by properly controlling coil currents, motion control in three dimensions can be achieved, even when the motion is along a line half way between two poles or along line away from one pole.

Imaging Optics

Figure 9:
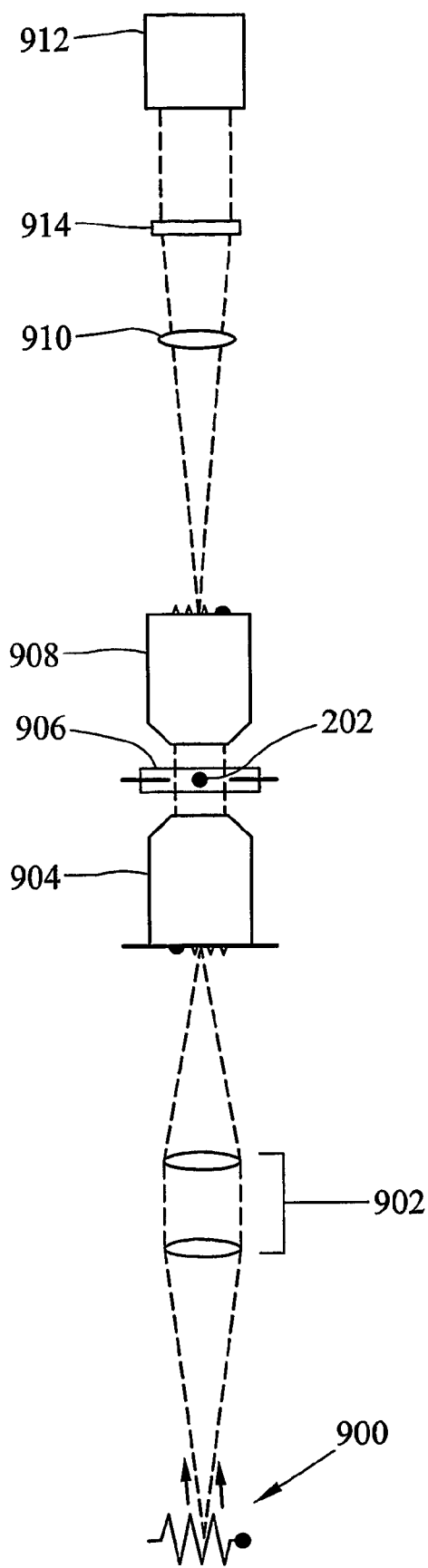
FIG. 9 is an optical schematic diagram illustrating exemplary imaging optics suitable for use in a system for three-dimensional motion control and tracking of a mechanically unattached magnetic probe according to an embodiment of the present invention.

As discussed above, the proposed design preferably includes imaging optics for viewing bead 202 in the system under test. FIG. 9 is an optical schematic diagram of exemplary imaging optics suitable for use with the methods and systems of the present invention. Referring to FIG. 9, the imaging optics include a light source 900 for illuminating the object being imaged. Light source 900 may be any suitable light source capable of uniform illumination of an object. In a preferred embodiment, light source 900 is a fiber light consisting of a halogen lamp and a bundle of optical fibers with the output coupled to the lower end of the imaging optics. An exemplary commercially available light source suitable for use with the present invention is the M1000 Fiber Light available from Edmond Optics.

In a preferred embodiment of the invention, Koehler illumination is used to illuminate the subject. In Koehler illumination, light from the light source is focused by a collector lens to form an image of the light source on the back focal plane of a condenser. Accordingly, in FIG. 9, collector lenses 902 form an image of light source 900 on the back focal plane of a condenser 904. Condenser 904 is an objective lens that corrects for spherical aberration, coma, and chromatic aberration and is optimized for bright field illumination. Bead 202 being imaged is located at the focal point of condenser 904 in a sample chamber 906. Upper objective lens 908 forms an image. A tube lens 910 focuses the lights rays exiting objective 908 onto the image plane of a CCD camera 912. A filter 914 filters the light entering CCD camera 912. CCD camera 912 converts the incident photons into an electronic signal and produces an electronic image of probe 202 and the sample under test.

The imaging system illustrated in FIG. 9 is referred to as a bright field imaging system. However, the present invention is not limited to using bright field imaging. For example, in an alternate embodiment of the invention, fluorescent imaging can be used to produce electronic images of probe 202 and the sample under test.

Tracking Optics

In order to control the position of a mechanically unattached bead in three dimensions, it is necessary to be able to track the bead in three dimensions. Additional reasons for and advantages of tracking the bead in three dimensions are that such tracking allows mapping of surfaces within a tracked volume, and when coupled with applied force measurements, viscoelastic properties of systems under test can be determined. For example, three-dimensional optical tracking while applying forces in three dimensions can be used to determine mechanical properties of structures within a cell, within a cell culture, or in any other biological system. Selective binding of the bead to specific organelles and large macromolecules can be used to determine binding coefficients.

Figure 10:
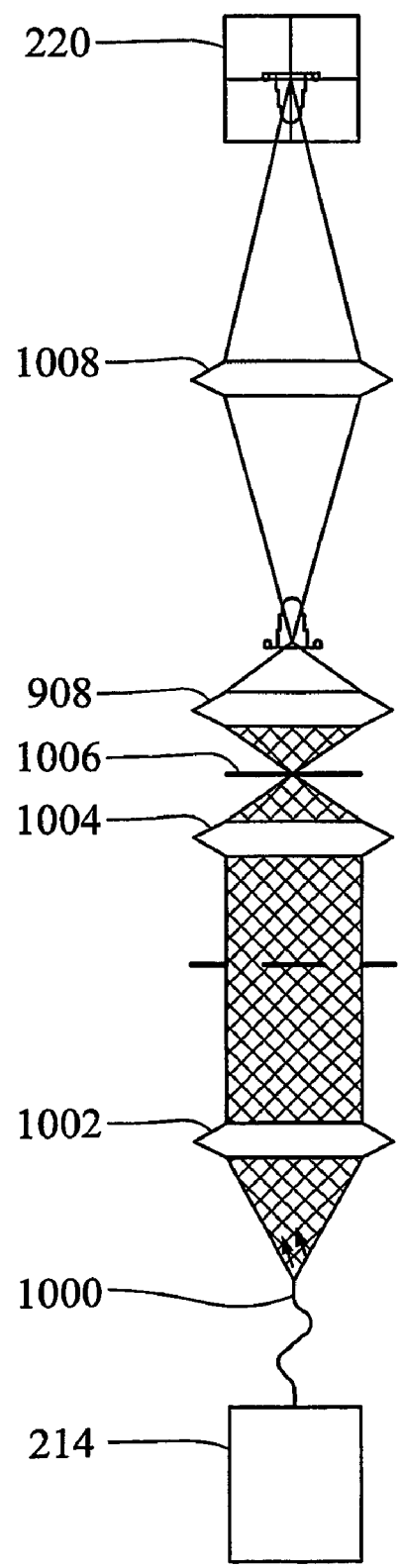
FIG. 10 is an optical schematic diagram illustrating exemplary tracking optics suitable for use in a system for three-dimensional motion control and tracking of mechanically unattached magnetic probe according to an embodiment of the present invention.

FIG. 10 illustrates exemplary tracking optics that may be used in a system for three dimensional tracking and position control of a free floating probe according to an embodiment of the present invention. In FIG. 10, the tracking optics include a laser light source 214 coupled to the remainder of the optics via a single mode optical fiber 1000. A columnmating lens 1002 columates the diverging light rays exiting fiber 1000. Condenser 1004 converges the light rays on the specimen sample 1006. Objective lens 908 collects the transmitted light beam and the light scattered from the bead on its back focal plane where it creates the Fourier transform of these two light fields. Lens 1008 moves the optical Fourier transform of the sample from the back focal plane of objective lens 908 to quadrant photodiode 220. Quadrant photodiode 220 converts the light into electronic signals indicative of optical intensities at various positions on the surface of quadrant photodiode 220.

Optical Tracking Theory and Equations

Figure 11:
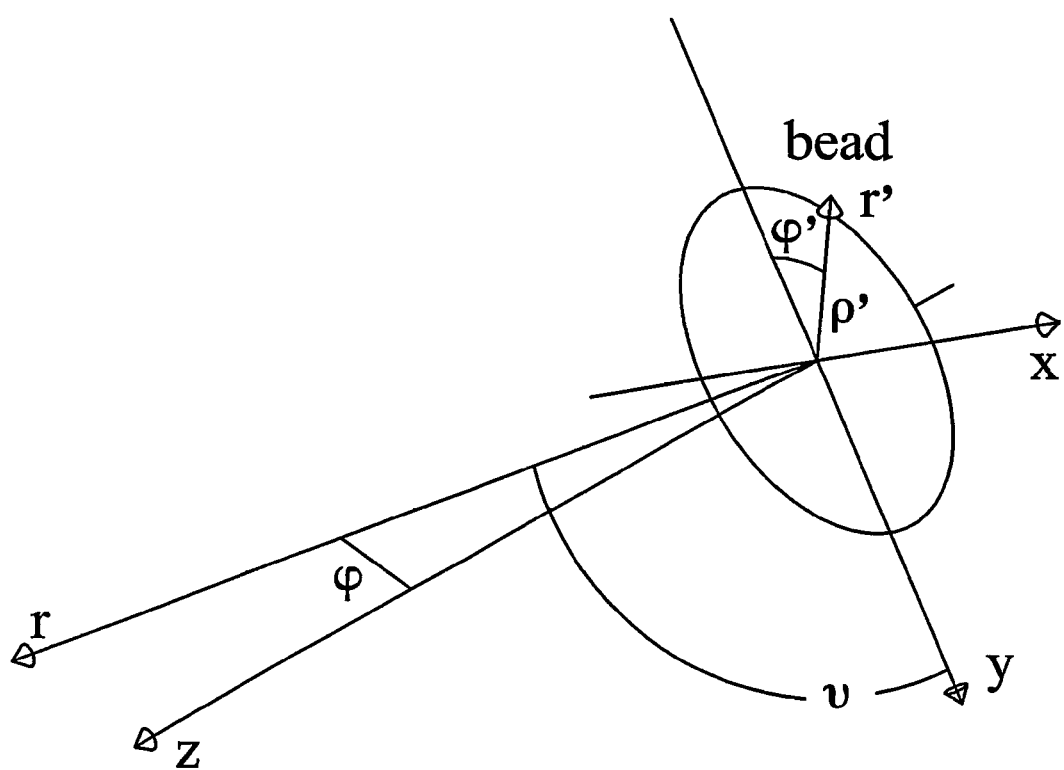
FIG. 11 is a perspective view illustrating exemplary coordinates and angles used in equations for tracking a mechanically unattached magnetic probe in three-dimensions according to an embodiment of the present invention.

Optical tracking equations based on intensity measurements made by quadrant photodiode 220 are theoretically based on Maxwell's Wave Equations. The following assumptions were made in order to perform the optical tracking calculations:

1. The bead acts like a Rayleigh scatterer (a dielectric sphere with a radius smaller than the wavelength of the incident light).
2. The finite size of the particle is accounted for, with a dielectric constant, $\in$, and a polarizability, +, $$\alpha = a^3 n_{solvent}^2 \cdot \frac{(m^2-1)}{(m^2+2)}$$

Where $$m = \frac{n_{bead}}{n_{solvent}}$$

and $n_{bead}$ and $n_{solvent}$ are the refractive indices of the bead and the solvent in which the bead is floating, and a is the radius of the bead. To simplify the math, the bead position r' is described in cylindrical coordinates z', $\rho'^2 = x'^2 + y'^2$, $\phi' = \text{atan}(y'/x')$, while the detected interference at point r is described in spherical coordinates (r, υ, φ) around the optical axis. FIG. 11 illustrates the spherical and cylindrical coordinates used in the bead position calculations.

3. The propagating electromagnetic field generated by the laser is modeled as a Gaussian beam with a scalar wavenumber k $$k = |k| = \frac{2\pi n_{solvent}}{\lambda}$$

the radius of curvature of the Gaussian beam is $$R(z) = z\left[1 + \left(\frac{z_0}{z}\right)^2\right]$$

the beam waist radius in the focal plane is $$\omega_0 = \sqrt{\lambda \frac{z_0}{\pi}}$$

and the phase is $$\zeta(z) = a\tan\left(\frac{z}{z_0}\right).$$

At the focus (i.e., the sample under test), the field generated by laser 214 undergoes the Gouy-phase jump, resulting in a ninety-degree phase shift between the focused laser field and a simple plane wave description of the phase of the light. The complex amplitude of the incident Gaussian electromagnetic field on the bead is given by $$E_i(r) = E_0 \frac{w_0}{w(z)} \exp\left[-\frac{\rho^2}{w^2(z)}\right] \exp\left[-ikz - ik\frac{\rho^2}{2R^2(z)} + i\zeta(z)\right] \quad (1)$$

When the field at quadrant photodiode 220 is observed, far from the focal plane (r>>z'$_0$), the following approximations can be used:

$$\zeta(z) = \arctan\left(\frac{z}{z_0}\right) \approx \frac{\pi}{2}, z \approx r, R(z) \approx \infty$$

$$\omega(z) \approx \frac{\omega_0 z}{z_0}, \sin(\upsilon) \approx \upsilon, \rho < \omega_0, \exp\left(-\frac{\rho^2}{\omega(z)^2}\right) \approx 1$$

the unscattered light in the far field is then given by $$E_u(r) = iE_0 \frac{k\omega_0}{2r} \exp\left[ikr - \frac{1}{4}k^2\omega_0^2\upsilon^2\right], \quad (2)$$

and this is normalized by $$E_0 = \frac{2}{\left(\omega_0 \sqrt{\pi \varepsilon_s c_s}\right)},$$

where $c_s$ is the speed of light in the sample under test. When a bead with a polarizability α, is placed at a position r', near the geometric focal point, the Rayleigh approximation for the scattered field at large r>>$z_0$ is $$E_s(r, r') \approx \frac{k^2 \alpha}{r} E(r') \exp[ik|r - r'|] \quad (3)$$

The change in the average light intensity I, due to the interference between the incident laser beam and the scattered light (subtracting the offset $|E|^2$) is $$\delta I = \frac{\varepsilon_s c_s}{2}(|E + E'|^2 - |E|^2) \approx \varepsilon_s c_s \text{Re}(EE')$$

Using equations (2) and (3), the intensity change in the back focal plane of objective 908 for a bead displacement r', from the geometrical focal point of objective 908 is $$\frac{\delta I(r, r')}{I_{tot}} = J(r, r')\sin\left[k\left(r - |r - r'| - z' - \frac{\rho'^2}{2R(z')} + \frac{\zeta(z')}{k}\right)\right] \quad (4)$$

Where $$j(r, r') = \frac{2k^3\alpha}{\pi r^3}(1 + (z'/z_0)^2)^{-1/2}\exp\left[-\frac{\rho'^2}{\omega(z')^2} - k^2\omega_0^2\vartheta^2\right]$$

The z-signal is extracted from the total intensity at the back focal plane of lens 908. Thus, equation (4) can be integrated over all angles to obtain the z-signal along the optical axis as:

$$\frac{I_z}{I}(Z') = \frac{8k\alpha}{\pi\omega_0^2}(1 + (z'/z_0)^2)^{-1/2}\sin\left(\arctan\left(\frac{z'}{z_0}\right)\right) \quad (5)$$

Figure 12A:
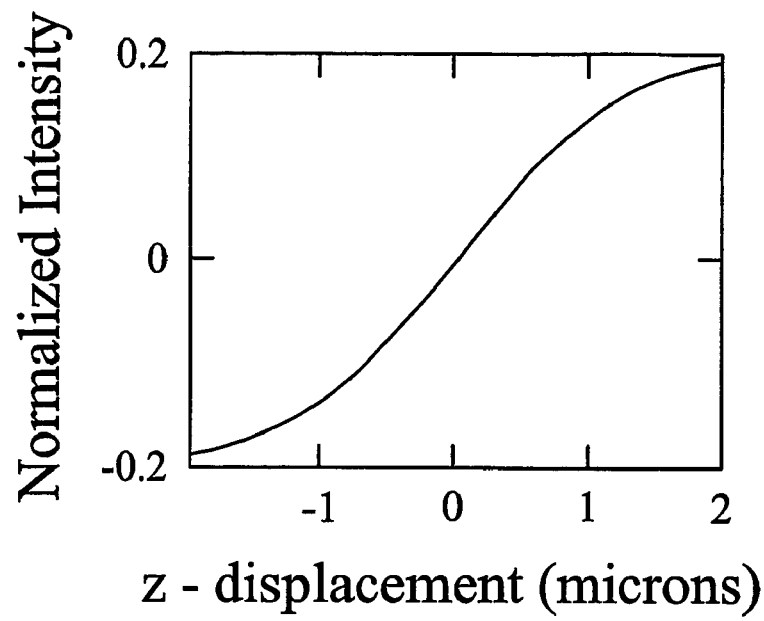
FIG. 12A is a graph of a linear profile of a normalized Z displacement signal generated by a system for tracking a mechanically unattached magnetic probe in three dimensions according to an embodiment of the present invention.

FIG. 12A is a graph of normalized intensity versus bead displacement in the Z direction (perpendicular to the surface of quadrant photodiode 220). The graph was generated assuming a 650 nm laser, a beam waist radius of 700 nm, a bead radius a=300 nm, and the refractive indices of the bead and the sample under test at 1.5 and 1.33, respectively. The result illustrated in Equation 5 and FIG. 12A is intuitive—as bead moves towards quadrant photodiode 220 in the Z direction, the normalized intensity increases and as the bead moves away from quadrant photodiode 220, the normalized intensity decreases. Thus, the change in intensity of the scattered and directly transmitted light measured by quadrant photodiode 220 can be used to track motion of bead 202 in the Z direction.

The lateral bead displacement (i.e., displacement in a plane parallel to the surface of QPD 220), may be determined by the difference in intensity between two halves of QPD 220. Thus, it is necessary to integrate half of the detection area to obtain the lateral signals. The two-dimensional result for a bead displacement, p', in the focal plane at an angle φ' is $$\frac{I_x}{I}(p', \varphi') = \frac{16k\alpha}{\sqrt{\pi\omega_0^2}}\cos(\varphi')\left(\frac{\rho'}{\omega_0}\right)\exp\left(-\left(\frac{\rho'}{\omega_0}\right)^2\right) \quad (6)$$

Figure 12B:
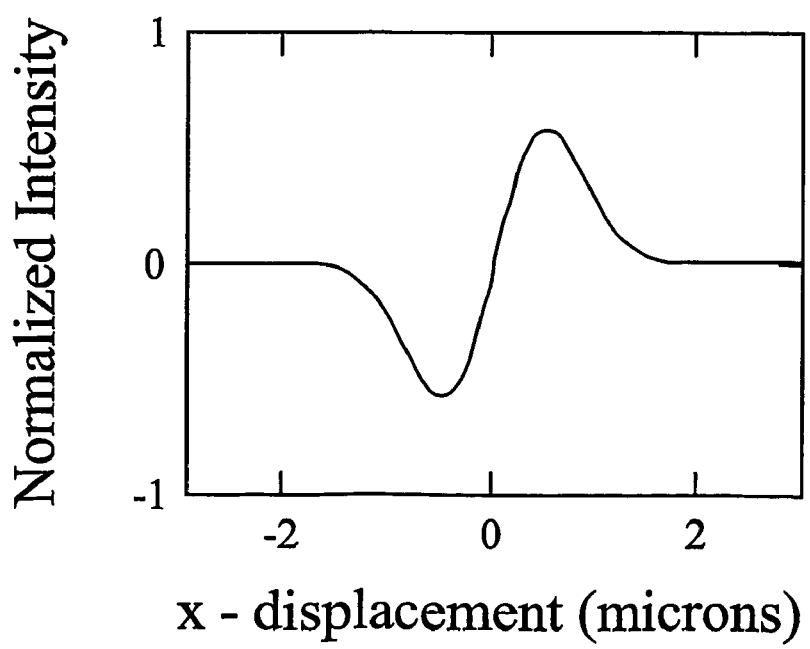
FIG. 12B is a graph of a linear profile of a normalized X displacement signal generated by a system for tracking a mechanically unattached magnetic probe in three dimensions according to an embodiment of the present invention.

FIG. 12B is a graph of normalized intensity versus displacement in the X direction generated by assuming the same laser, beam waist, beam radius, and bead and sample materials described above with regard to FIG. 12A. As illustrated in FIG. 12B, normalized intensity is zero for displacements to the far left and the far right of the center of quadrant photodiode 220. This is because light is being scattered outside of the image plane of quadrant photodiode 220. In the region near the center of quadrant photodiode 220, normalized intensity varies approximately sinusoidally with displacement. The results for displacement in the Y direction are similar to those illustrated in FIG. 12B for the X direction. Thus, by measuring the intensity and calculating the change in intensity of light measured by different regions of quadrant photodiode 220, motion of a mechanically unattached probe can be tracked in a plane parallel to the surface of quadrant photodiode 220.

Equations (5) and (6) or approximations of Equations (5) and (6) may be implemented as a position calculator in hardware and/or software in computer 204 illustrated in FIG. 2. Such a position calculator receives the signals output from quadrant photodiode 220 and calculates position, velocity, and/or acceleration of bead 202 in the system under test.

Three-Dimensional Motion Control Using Time Division Multiplexed Coil Currents

Figure 13A:
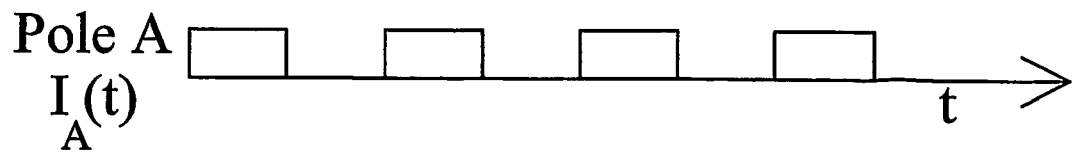
FIG. 13A is a timing diagram illustrating an exemplary magnetizing current that may be used to pull a mechanically unattached magnetic probe towards a single pole in a system for controlling motion of a mechanically unattached magnetic probe in three dimensions according to an embodiment of the present invention.

Referring again to FIG. 2, computer 204 receives a bead position signal and outputs a bead position control signal to magnetic coil and pole assembly 200 to minimize the error between a desired bead position and an actual bead position. In the four-pole geometry illustrated in FIGS. 3 and 4, it is possible to control the position of the bead in three dimensions. In a preferred embodiment, time division multiplexing of pole currents is used to control the position of the bead in three dimensions. For example, in order to pull the bead in a direction towards a single pole, magnetizing current for that pole is preferably periodically energized such that the time average of the force on the bead is equal to the desired force. FIG. 13A illustrates an exemplary magnetizing current that may be used to pull the bead in a direction towards a single pole. In FIG. 13A, the current $I_A(t)$ for a single pole, pole A, is energized periodically with a predetermined intensity to achieve a desired average magnetic force towards pole A.

Figure 13B:
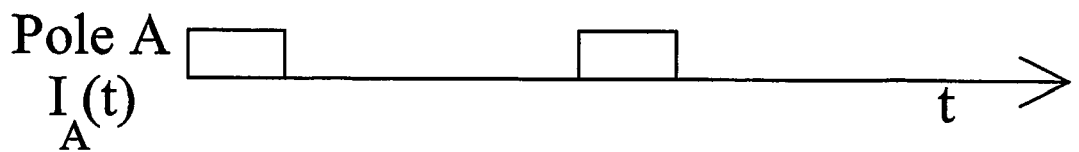
FIG. 13B is a timing diagram illustrating exemplary magnetizing currents for two poles that may be used to pull a mechanically unattached magnetic probe in a direction intermediate between two poles in a system for controlling motion of a mechanically unattached magnetic probe in three dimensions according to an embodiment of the present invention.
Figure 13B:
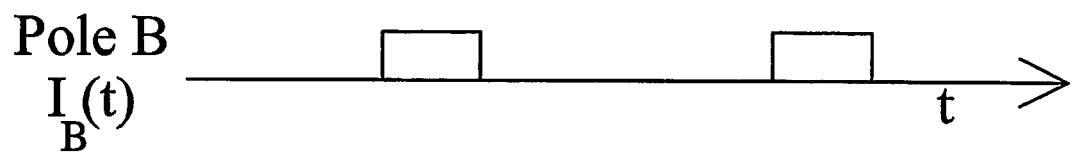

In another example, it may be desirable to pull the bead in a direction along a line that is intermediate between two poles. To pull the bead along such a line, the magnetizing current for each of the two poles would be energized for some fraction of the time relative to each other, resulting in a zigzag motion of the bead about the desired line. FIG. 13B illustrates exemplary magnetizing currents that may be used for pulling the bead along a line half way between two poles. In FIG. 13B, pole currents $I_A(t)$ and $I_B(t)$ for two poles, pole A and pole B are each periodically energized 50% of the time to achieve motion in a direction half way between poles A and B.

Figure 13C:
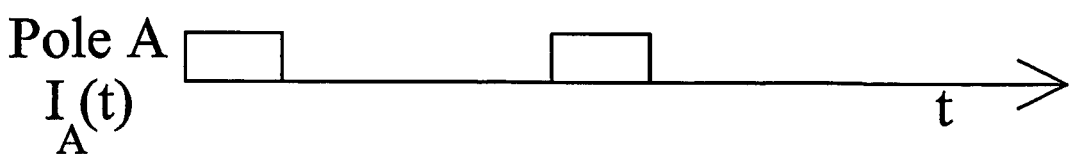
FIG. 13C is a timing diagram illustrating exemplary magnetizing currents for three coils that may be used to pull a magnetic probe in a direction intermediate between three poles in a system for controlling motion of a mechanically unattached magnetic probe in three dimensions according to an embodiment of the present invention.
Figure 13C:
Figure 13C:
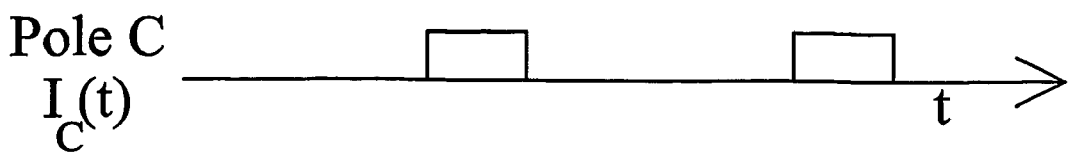

The most difficult case in a four-pole geometry is pulling the bead in a direction away from one of the poles. In order to pull the bead in a direction away from one of the poles, it is necessary to periodically magnetize each of the other three poles some fraction of the time relative to each other, resulting in a spiraling bead motion away from the pole that is not being magnetized. FIG. 13C illustrates exemplary pole magnetizing currents that may be used to bead away from a single pole in a four-pole geometry. In FIG. 13C, pole currents $I_A(t)$, $I_B(t)$, and $I_C(t)$ are periodically turned on 33% of the time with respect to each other to pull the bead in a direction away from a fourth pole that is not energized.

The present invention is not limited to a four-pole design or to using TDM coil currents to control motion of a mechanically unattached probe in three dimensions. For example, more than four poles can be used to enhance the ability to control motion of the probe in three dimensions. In addition, any suitable non-TDM coil currents can be used to achieve the desired force in the desired direction.

Thus, as illustrated above, the present invention includes methods and systems for optically tracking and controlling motion of a free floating magnetic bead in three dimensions. The methods and systems are particularly well suited for determining mechanical properties of enclosed objects, such as biological cells, where a mechanical connection is not possible. The methods and systems of the present invention may also have applications in material science or any other field in which it is desirable to measure mechanical properties of small surfaces in areas unreachable by a mechanically attached probe.

The Force Equation

The force on a permeable soft magnetic bead is caused by the interaction between an incident magnetic field B and the magnetic dipole moment m induced in the bead by B. Subject to saturation properties of the bead material, $$m = \frac{\pi d^3}{6\mu_0}\left(\frac{\mu_r - 1}{\mu_r}\right)B, \quad \text{[SI units]}$$

where $\mu_0$ is the permeability of free space, $\mu_r$ is the relative permeability of the bead, and d is the diameter of the bead. This agrees with the result $m=(4\pi a^3/3\mu_0)\chi B$ published by [Amblard96] in the limit of small $\chi=\mu_r-1$, where a is the radius of the bead. The force exerted on m by B is, $$F = \frac{\pi d^3}{3\mu_0}\left(\frac{\mu_r - 1}{\mu_r}\right)B\nabla B.$$

The magnitude B of the field generated by a magnetic monopole is of the form $B_p/r^2$ where $B_p$ is the pole strength and r is the distance from the monopole. The corresponding gradient $\nabla B$ of the field is $2B_p/r^3$, directed towards the monopole. Thus the force on a bead is towards the monopole, varying as $B_p^2/r^5$. Clearly, the distance of the monopoles from the bead are of primary concern in the optimizing the magnitude of the force.

Magnetic Particle Force Microscope for Manipulation in Cells

Currently, force microscopy has two major drawbacks for biological imaging. First, the measuring tip is attached to a cantilever for position control and force sensing. It cannot probe beneath objects; we can image only the tops of surface-bound objects. Second, present-day microscopes cannot go inside living cells, because the cantilever would have to protrude through the cell membrane.

Freeing the tip from the cantilever alleviates both of these problems. But now we need to implement new ways of force generation and position sensing. The current implementation of 3D force microscope (3DFM) using a free particle uses an optical beam in a laser tweezers configuration (Optical Force Microscope, PFM [Ghislain 1993]) both to apply forces and to track the particle position. Whereas the laser tweezers technique has made possible experiments in single molecule dynamics [Svoboda1994], the optical beam can generate only relatively small forces, normally ip to several tens of picoNewtons [Mehta1998]. This is insufficient to break covalent bonds, or to measure the full mechanical properties of biological fibers such as microtubules. In addition, the method of applying the force is nonspecific (optical index contrast), and the trap can accumulate extraneous material from the cytosol in live cell studies.

In the following we describe a novel alternative design for a 3D Force Microscope, and provide an overview of the design and challenge of the 3DFM. In the Collaboration section, we describe three initial target research projects that will use the instrument: mucociliary clearance, biomotors, and microtubule mechanics (live cells).

3D Magnetic Force Microscope: Our collaborators have invented a 3-D free-particle force microscope that combines and extends known technologies. Bausch has used magnetic beads to apply forces in one dimension to cell membranes and to measure the viscosity Inside living cells [Bausch1998]. The Optical Force Microscope (OFM) monitors its particle position with optical light scattering, achieving a resolution on the order to 1 nm in all three dimensions with a band-width exceeding 10 kHz [Allersma1998; Gittes1998b; Gittes1998a]. The optical tweezers technique has been demonstrated as a 2D force microscope in the imaging of a surface [Ghislain1993]. Our collaborators have a design that extends magnetic force control to a 3-D working volume and uses optical light scattering for tracking.

Such an approach promises substantial advantages. The force is applied selectively to the magnetic bead, and so does not directly affect cell organelles or proteins. The magnetic field does not heat the medium while exerting forces, whereas heating limits the force that can be applied by an OFM. We calculate that the magnetic field can apply forces in excess of 2.2nN for a 2-micron diameter paramagnetic probe. The system will also be able to track and control much smaller beads, down to tens of nanometers in diameter (see below for details).

This freely-manipulated probe particle can act variously as a sensor and actuator 1. Force Imaging: Tracking the particle position as it moves through the cell, either by diffusion or by applied magnetic forces, can trace organelle or filament surfaces. As with all probe microscopes, this will provide images that have a resolution far finer than that of optical imaging.
2. Manipulation: Poking the particle against an organelle inside the cell.
   This can be used to:
   a. Position an organelle to initiate a cellular function;
   b. Measure forces applied by the cell on the organelle as part of normal cellular function (e.g. transport by cellular motors);
   c. Measure mechanical properties through applied deformations (e.g. bending microtubles).
3. Viscoelastic Properties: The Brownian or driven fluctuations in the particle position are determined by the viscoelastic properties of the medium (as described by the fluctuation-dissipation theorem). This can be used to map out of the local viscosity within cells or other media, such as the mucus layers of the mucociliary clearance collaboration [Bausch1998 1250]
4. Optical properties: The magnetic probe illuminated by a laser can act as a mobile optical source with a spatial resolution of the bead size, well below the diffraction limit. We envision several experiments:
   a. Near-field Optical Probe: a silver-coated probe particle will substantially enhance the scattered optical field within several nanometers of its surface. This is the exponentially decaying near field. Any fluorescent molecules falling within the near field should have enhanced fluorescence. The probe, as manipulated around the sample volume, will excite local populations of fluorophores. [Betzig1993]
   b. In technique (a), background fluorescence exited by the laser beam itself hurts the signal-noise ratio. [Vickerey1999]. Fluorescence Resonant Energy Transfer (FRET) can be used to shift the radiation's frequency when it leaves the probe, thus eliminating the background noise at the measurement frequency. One functionalizes the probe with an adsorbed fluorescent molecule and illuminating the particle with a wavelength that excites the fluorescent probe molecule. One dyes the cell component of interest with the complementary FRET molecule. The resonant energy transfer is very short range, compared to probe diameter, so this technique should be able to probe the location of the complementary molecule with a resolution of the probe diameter.

c. Raman Spectroscopy: If the magnetic bread is coated with silver, it will serve as a local probe of surface enhanced Raman spectroscopy. [Nle1997]

In the case of optical forces, the laser beam, as a radiated field, can be focused to produce a field maximum distant from the source, and a true trap is produced to confine the particle. In the case of magnetic fields the field maximum is at the pole, and the force on a distant particle is always attractive. Therefore, it is necessary to use feedback control for the particle position. Even though general dynamic control over a particle presents stability issues, the liquid environment is highly viscous, and Reynolds numbers are small enough that inertia insignificant.

Magnetic Actuation Design and Simulation: Magnetic bead microtheology is not new [Crick1949], but sufficient development of translational actuation technology is relatively recent [Ziemann1994; Guilford1995]. Interaction between magnetic pole pieces of Ziemann's rheometer limited the field gradient necessary for high forces, but a single pole high force modification was reported in [Bausch1999]. A 2D magnetic bead manipulator was reported by [Amblard1996] using feedback to linearize the magnetic fields at the pole faces, trading force and bandwidth for precision and flexibility over an extended working volume.

Our design exploits the geometric symmetry of the simplest Platonic solid, an equilateral tetrahedron. Four tapered pole pieces converge from the vertices to the center. The field coils around these cores are tapered to provide maximum clearance for optical access by a high numerical aperture microscope. The virtual tetrahedron has three pairs of skew-perpendicular "opposite" edges. The lines connecting the mid points of these opposite edges pass through the center and have the greatest angular clearance from the vertices. Moreover, they are orthogonal, so the microscope's optical axis can be conveniently perpendicular to a microscope slide. Not shown is an external magnetic shell providing a return path for the flux between poles.

This pole geometry avoids the loss of gradient due to mutual pole adjacency in Ziemann's geometry. It also enables pole tips to be much closer to the sample than Amblard's for several reasons. We have no need to minimize the Z field component, or to measure the fields at the pole faces. We achieve extended working volume by other means, the XYZ translation stage.

It will be understood that various details of the invention may be changed without departing from the scope of the invention. Furthermore, the foregoing description is for the purpose of illustration only, and not for the purpose of limitation—the invention being defined by the claims.

What is claimed is:

1. A system for applying a force to and sensing a position of a mechanically unattached probe to provide three-dimensional control of position and velocity of the probe and an estimate of three-dimensional forces acting on the probe in its physical environment, the system comprising:
   (a) a mechanically unattached probe comprising a paramagnetic bead for applying force to a specimen;
   (b) n magnetic poles, n being an integer of at least four, the poles being geometrically arranged with respect to each other for applying force in three dimensions to the probe and thereby for effecting movement of the probe in three dimensions;
   (c) at least one magnetizing coil being coupled to the poles for magnetizing the poles to apply magnetic force to the probe wherein, when magnetized, each magnetic pole applies force to the probe in a direction towards the magnetized pole;
   (d) an optical tracker for tracking the position of the probe in three dimensions and producing measured position feedback;
   (e) a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe; and
   (f) means for determining a viscoelastic property of the system under test using the tracked probe position and applied force measurements.

2. The system of claim 1 wherein n equals four.

3. The system of claim 1 wherein each of the poles comprises an elongate member having a tapered end proximal to the probe for focusing magnetic force on the probe.

4. The system of claim 1 wherein the poles converge from vertices of a virtual equilateral tetrahedron towards a center of the virtual equilateral tetrahedron.

5. The system of claim 1 wherein the poles include first and second poles being symmetrically arranged with respect to each other on a first side of the probe and third and fourth poles being symmetrically arranged with respect to each other on a second side of the probe.

6. The system of claim 1 wherein the at least one magnetizing coil includes a plurality of magnetizing coils.

7. The system of claim 6 wherein the plurality of magnetizing coils includes one coil for each pole and wherein each of the magnetizing coils is wound around one of the poles.

8. The system of claim 6 wherein the plurality of magnetizing coils includes at least one coil for each pole and wherein the coils are spaced from the poles.

9. The system of claim 1 wherein the three-dimensional motion controller is adapted to drive the coils by applying time division multiplexed coil currents to the coils such that the average force produced by the coils on the probe results in motion of the probe in a desired direction.

10. The system of claim 1 comprising imaging optics for producing an optical image of the probe and the specimen.

11. The system of claim 10 wherein the imaging optics comprise:
   (a) a light source for illuminating the probe and the specimen;
   (b) a sensor for sensing light emanating from the probe and a specimen; and
   (c) a lens system for focusing the light emanating from the probe and the specimen on the sensor.

12. The system of claim 1 wherein the magnetic poles, the magnetizing coil, the optical tracker, and the three-dimensional motion controller are adapted to control motion of and track the probe in a three-dimensional force microscopy application.

13. A system for applying a force to and sensing a position of a mechanically unattached probe to provide three-dimensional control of position and velocity of the probe and an estimate of three-dimensional forces acting on the probe in its physical environment, the system comprising:

(a) n magnetic poles, n being an integer of at least four, the poles being geometrically arranged with respect to each other for applying magnetic force in three dimensions to a mechanically unattached magnetic probe and thereby for effecting movement of the probe in three dimensions;

(b) at least one magnetizing coil being coupled to the poles for magnetizing the poles to apply magnetic force to the probe;

(c) an optical tracker for tracking the position of the magnetic probe in three dimensions and producing measured position feedback;

(d) a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe;

(e) a light source for generating a beam of light in a direction towards the magnetic probe;

(f) a sensor for sensing the light beam and light scattered from the beam by the probe;

(g) a plurality of lenses for directing the light beam and the light scattered by the probe to an imaging plane of the sensor;

(h) a position calculator for calculating a position of the probe in three dimensions based on an interference between the light beam and the scattered light in the imaging plane of the sensor; and (i) means for determining a viscoelastic property of the system under test using the tracked probe position and applied force measurements.

14. The system of claim 13 wherein the position calculator calculates a first displacement of the probe in a direction parallel to the light beam based on changes in the interference over the entire sensor.

15. The system of claim 13 wherein the probe comprises a paramagnetic bead for applying force to a system under test and wherein, when magnetized, each magnetic pole applies a force to the probe in a direction towards the magnetized pole.

16. The system of claim 13 wherein the magnetic poles, the magnetizing coil, the optical tracker, and three-dimensional motion controller are adapted to control motion and track the probe in a three-dimensional force microscopy application.

17. A system for applying a force to and sensing a position of a mechanically unattached probe to provide three-dimensional control of position and velocity of the probe and an estimate of three-dimensional forces acting on the probe in its physical environment, the system comprising:

(a) n magnetic poles, n being an integer of at least four, the poles being geometrically arranged with respect to each other for applying magnetic force in three dimensions to a mechanically unattached magnetic probe and thereby for effecting movement of the probe in three dimensions;

(b) at least one magnetizing coil being coupled to the poles for magnetizing the poles to apply magnetic force to the probe;

(c) an optical tracker for tracking the position of the magnetic probe in three dimensions;

(d) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

(e) a light source for generating a beam of light in a direction towards the magnetic probe;

(f) a sensor for sensing the light beam and light scattered from the beam by the probe;

(g) a plurality of lenses for directing the light beam and the light scattered by the probe to an imaging plane of the sensor; and (h) a position calculator for calculating a position of the probe in three dimensions based on an interference between the light beam and the scattered light in the imaging plane of the sensor, wherein the sensor comprises a quadrant photodiode.

18. A system for applying a force to and sensing a position of a mechanically unattached probe to provide three-dimensional control of position and velocity of the probe and an estimate of three-dimensional forces acting on the probe in its physical environment, the system comprising:

(a) n magnetic poles, n being an integer of at least four, the poles being geometrically arranged with respect to each other for applying magnetic force in three dimensions to a mechanically unattached magnetic probe and thereby for effecting movement of the probe in three dimensions;

(b) at least one magnetizing coil being coupled to the poles for magnetizing the poles to apply magnetic force to the probe;

(c) an optical tracker for tracking the position of the magnetic probe in three dimensions;

(d) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

(e) a light source for generating a beam of light in a direction towards the magnetic probe;

(f) a sensor for sensing the light beam and light scattered from the beam by the probe;

(g) a plurality of lenses for directing the light beam and the light scattered by the probe to an imaging plane of the sensor; and (h) a position calculator for calculating a position of the probe in three dimensions based on an interference between the light beam and the scattered light in the imaging plane of the sensor, wherein the position calculator calculates a second displacement of the probe in a direction transverse to the light beam based on differences in the interference on different regions of the sensor.

19. A magnetic coil and pole assembly for controlling in three dimensions, force on and motion of a mechanically unattached magnetic probe comprising a paramagnetic bead, the magnetic coil and pole assembly comprising:

(a) n magnetic poles, n being an integer of at least four, the poles being geometrically arranged with respect to each other for applying magnetic force in three dimensions to the probe and thereby for effecting movement of the probe in three dimensions;

(b) at least one magnetizing coil being coupled to the poles for magnetizing the poles to apply force to the probe wherein, when magnetized, each magnetic pole applies force to the probe in a direction towards the pole being magnetized;

(c) an optical tracker for tracking position of the probe and producing measured position feedback;

(d) a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe; and (e) means for determining a viscoelastic property of the system under test using the tracked probe position and applied force measurements.

20. The assembly of claim 19 wherein n equals 4.

21. The assembly of claim 19 wherein the poles each comprise an elongate member having a tapered end proximal to the probe for focusing magnetic force on the probe.

22. The assembly of claim 19 wherein the poles converge from vertices of a virtual equilateral tetrahedron towards a center of the virtual equilateral tetrahedron.

23. The assembly of claim 19 wherein the poles comprise first and second poles being symmetrically arranged with respect to each other on a first side of the probe and third and fourth poles being symmetrically arranged with respect to each other on a second side of the probe.

24. The assembly of claim 19 wherein the at least one magnetic coil includes a plurality a magnetic coils.

25. The assembly of claim 24 wherein the plurality of magnetic coils comprises one coil corresponding to each pole and wherein each of the magnetizing coils is wound around one of the poles.

26. The assembly of claim 24 wherein the at least one magnetic coil comprises a plurality of magnetic coils, at least one coil corresponding to each pole, wherein the coils are spaced from the poles.

27. The assembly of claim 26 comprising a plurality of magnetic members for magnetically coupling the coils to the poles.

28. The assembly of claim 19 wherein the poles and the magnetizing coil are adapted to control position of the probe in a three-dimensional force microscopy application.

29. A method for three-dimensional motion control and optical tracking of a mechanically unattached magnetic probe, the method comprising:

(a) placing a mechanically unattached magnetic probe comprising a paramagnetic bead in a system under test including a specimen for applying force to the specimen;

(b) tracking a position of the probe in three dimensions using an optical tracker;

(c) while tracking the position of the probe in three dimensions, driving a plurality of magnetic poles to control motion of the probe in three dimensions by reducing error between the tracked position of the probe and a desired position of the probe, wherein driving a plurality of magnetic poles includes magnetizing one of the poles to apply force to the probe in a direction towards the one pole;

(d) providing a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe; and (e) determining a viscoelastic property of the system under test using the tracked probe position and applied force measurements.

30. The method of claim 29 wherein placing a mechanically unattached magnetic probe in a system under test includes placing the probe inside of a biological system.

31. The method of claim 29 wherein placing a mechanically unattached magnetic probe in a system under test includes placing the probe in a viscous medium.

32. The method of claim 29 wherein driving the plurality of magnetic poles to control motion of the probe in three-dimensions includes driving the poles to control motion of the probe in a three-dimensional force microscopy application.

33. A method for three-dimensional motion control and optical tracking of a mechanically unattached magnetic probe, the method comprising:

(a) placing a mechanically unattached magnetic probe in a system under test including a specimen for applying force to the specimen;

(b) tracking position of the probe in three dimensions using an optical tracker;

(c) while tracking the position of the probe in three dimensions, driving a plurality of magnetic poles to control motion of the probe in three dimensions by reducing error between the tracked position of the probe and a desired position of the probe;

(d) providing a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe;

(e) wherein placing a mechanically unattached magnetic probe in a system under test includes placing the probe inside of a biological system;

(f) wherein placing the probe inside of a biological system includes placing the probe inside of a living cell; and (g) determining a viscoelastic property of the system under test using the tracked probe position and applied force measurements.

34. The method of claim 33 wherein the magnetic probe comprises a paramagnetic bead for applying force to a system under test and wherein driving the plurality of magnetic poles includes magnetizing one of the poles to apply force to the probe in the direction of a magnetized pole.

35. A method for three-dimensional motion control and optical tracking of a mechanically unattached magnetic probe, the method comprising:

(a) placing a mechanically unattached magnetic probe in a system under test including a specimen for applying force to the specimen;

(b) tracking position of the probe in three dimensions using an optical tracker;

(c) while tracking the position of the probe in three dimensions, driving a plurality of magnetic poles to control motion of the probe in three dimensions by reducing error between the tracked position of the probe and a desired position of the probe;

(d) a three-dimensional motion controller receiving as input a probe position set point and being coupled to the optical tracker and the at least one magnetizing coil, the three-dimensional motion controller being adapted to minimize an error between the set point and the measured position feedback by driving the at least one magnetizing coil to produce a magnetic force on the probe to move the probe in three dimensions to reduce the error, thereby forming a closed feedback loop to control the position of the probe;

(e) wherein tracking position of the probe in three dimensions includes illuminating the probe with a beam of light, measuring light scattered by the probe and direct light from the beam, and determining position of the probe in three-dimensions based on interference between the scattered and direct light; and (f) determining a viscoelastic property of the system under test using the tracked probe position and applied force measurements.

36. The method of claim 35 wherein the probe comprises a paramagnetic bead for applying force to a system under test and wherein driving the plurality of magnetic poles includes magnetizing one of the poles to apply force to the probe in the direction of the magnetized pole.

37. The method of claim 35 wherein driving the plurality of magnetic poles to control motion of the probe in three-dimensions includes driving the poles to control motion of the probe in a three-dimensional force microscopy application.

38. A system for applying a force to and sensing a position of a mechanically unattached probe to provide three-dimensional control of position and velocity of the probe and an estimate of three-dimensional forces acting on the probe in its physical environment, the system comprising:

(a) a mechanically unattached probe comprising a paramagnetic bead for applying force to a system under test;

(b) n magnetic poles, n being an integer of at least four, the poles being geometrically arranged with respect to each other for applying force in three dimensions to the probe and thereby for effecting movement of the probe in three dimensions;

(c) at least one magnetizing coil being coupled to the poles for magnetizing the poles to apply magnetic force to the probe wherein, when magnetized, each magnetic pole applies force to the probe in a direction towards the magnetized pole;

(d) an optical tracker for tracking the position of the probe in three dimensions; and (e) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

wherein the three-dimensional motion controller is adapted to drive the coils by applying time division multiplexed coil currents to the coils such that the average force produced by the coils on the probe results in motion of the probe in a desired direction, and wherein the three-dimensional motion controller is adapted to pull the probe in a direction towards a single pole by applying a time division multiplexed coil current to a coil magnetically coupled to the single pole such that the average force produced by the single pole is in a direction towards the single pole.

39. A system for applying a force to and sensing a position of a mechanically unattached probe to provide three-dimensional control of position and velocity of the probe and an estimate of three-dimensional forces acting on the probe in its physical environment, the system comprising:

(a) a mechanically unattached probe comprising a paramagnetic bead for applying force to a system under test;

(b) n magnetic poles, n being an integer of at least four, the poles being geometrically arranged with respect to each other for applying force in three dimensions to the probe and thereby for effecting movement of the probe in three dimensions;

(c) at least one magnetizing coil being coupled to the poles for magnetizing the poles to apply magnetic force to the probe wherein, when magnetized, each magnetic pole applies force to the probe in a direction towards the magnetized pole;

(d) an optical tracker for tracking the position of the probe in three dimensions; and (e) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

wherein the three-dimensional motion controller is adapted to drive the coils by applying time division multiplexed coil currents to the coils such that the average force produced by the coils on the probe results in motion of the probe in a desired direction, and wherein the three-dimensional motion controller is adapted to selectively apply time division multiplexed coil currents to two poles such that the average force on the probe is along a line intermediate between the two poles, thereby pulling the probe in a direction intermediate between the two poles.

40. A system for applying a force to and sensing a position of a mechanically unattached probe to provide three-dimensional control of position and velocity of the probe and an estimate of three-dimensional forces acting on the probe in its physical environment, the system comprising:

(a) a mechanically unattached probe comprising a paramagnetic bead for applying force to a system under test;

(b) n magnetic poles, n being an integer of at least four, the poles being geometrically arranged with respect to each other for applying force in three dimensions to the probe and thereby for effecting movement of the probe in three dimensions;

(c) at least one magnetizing coil being coupled to the poles for magnetizing the poles to apply magnetic force to the probe wherein, when magnetized, each magnetic pole applies force to the probe in a direction towards the magnetized pole;

(d) an optical tracker for tracking the position of the probe in three dimensions; and (e) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

wherein the three-dimensional motion controller is adapted to drive the coils by applying time division multiplexed coil currents to the coils such that the average force produced by the coils on the probe results in motion of the probe in a desired direction, and wherein the three-dimensional motion controller is adapted to selectively apply time division multiplexed coil currents to three of the poles such that the average force on the probe is in a direction away from a fourth pole, thereby moving the probe in a direction intermediate between the three poles.

41. A method for three-dimensional motion control and optical tracking of a mechanically unattached magnetic probe, the method comprising:

(a) placing a mechanically unattached magnetic probe in a system under test;

(b) tracking position of the probe in three dimensions;

(c) while tracking the position of the probe in three dimensions, driving a plurality of magnetic poles to control motion of the probe in three dimensions by reducing error between the tracked position of the probe and a desired position of the probe; and (d) wherein tracking position of the probe in three dimensions includes illuminating the probe with a beam of light, measuring light scattered by the probe and direct light from the beam, and determining position of the probe in three-dimensions based on interference between the scattered and direct light, and wherein determining position of the probe based on scattered and direct light includes sensing the sum of the scattered and direct light with an electronic sensor and calculating displacement of the probe in a direction transverse to a surface of a specimen based on differences in the light measured by the sensor.

42. A method for three-dimensional motion control and optical tracking of a mechanically unattached magnetic probe, the method comprising:

(a) placing a mechanically unattached magnetic probe in a system under test;

(b) tracking position of the probe in three dimensions; and (c) while tracking the position in three dimensions, driving a plurality of magnetic poles to control motion of the probe in three dimensions by reducing error between the tracked position of the probe and a desired position of the probe, wherein tracking position of the probe in three dimensions includes illuminating the probe with a beam of light, measuring light scattered by the probe and direct light from the beam, and determining position of the probe in three-dimensions based on the scattered and direct light, and wherein calculating displacement of the probe based on the scattered and direct light includes detecting the sum of the scattered and direct light using an electronic sensor and calculating displacement of the probe in a direction parallel to a surface of the specimen by determining differences in the scattered and direct light measured by different regions on the surface of the sensor.

43. A method for three-dimensional motion control and optical tracking of a mechanically unattached magnetic probe, the method comprising:

(a) placing a mechanically unattached magnetic probe comprising a paramagnetic bead in a system under test for applying force to the system under test;

(b) tracking a position of the probe in three dimensions; and (c) while tracking the position of the probe in three dimensions, driving a plurality of magnetic poles to control motion of the probe in three dimensions by reducing error between the tracked position of the probe and a desired position of the probe, wherein during a plurality of magnetic poles includes magnetizing one of the poles to apply force to the probe in a direction towards the one pole, wherein driving a plurality of magnetic poles to control three-dimensional motion of the probe includes applying time division multiplexed coil currents to magnetizing coils associated with the poles to produce an average force on the probe in a desired direction.

44. The method of claim 43 wherein applying time division multiplexed coil currents to the poles includes applying a time division multiplexed coil current to a coil for driving a single pole to pull the probe in a direction towards the single pole.

45. The method of claim 43 wherein applying time division multiplexed coil currents to coils associated with the poles includes applying time division multiplexed coil currents to coils associated with two poles for magnetizing the two poles to produce motion of the probe in a direction intermediate between the two poles.

46. The method of claim 43 wherein applying time division multiplexed coil currents include applying time division multiplexed coil currents to coils associated with three of the poles to produce motion of the probe in a direction intermediate between the three poles.

47. A system for applying a force to and sensing a position of a mechanical unattached probe to provide three-dimensional control of position and velocity of the probe and an estimate of three-dimensional forces acting on the probe in its physical environment, the system comprising:

(a) n magnetic poles, n being an integer of at least four, the Doles being geometrically arranged with resect to each other for applying magnetic force in three dimensions to a mechanically-unattached, mechanically unattached magnetic probe and thereby for effecting movement of the probe in three dimensions;

(b) at least one magnetizing coil being coupled to the poles for magnetizing the poles to apply magnetic force to the probe;

(c) an optical tracker for tracking the position of the magnetic probe in three dimensions;

(d) a three-dimensional motion controller coupled to the optical tracker and the magnetizing coil for measuring an error between a control signal indicative of a desired position and a sensed position signal and for driving the coil to produce a magnetic force on the probe for moving the probe in three dimensions to reduce the error;

(e) a stage for supporting the specimen and the probe; and (f) a controller for controlling position of the stage as the probe is moved.

48. A system for applying a force to and sensing a position of a mechanically unattached probe to provide three-dimensional control of position and velocity of the probe and an estimate of three-dimensional forces acting on the probe in its physical environment, the system comprising:
(a) n magnetic poles, n being an integer of at least four, the poles being geometrically arranged with respect to each other for applying magnetic force in three dimensions to a mechanically-unattached, mechanically unattached magnetic probe and thereby for effecting movement of the probe in three dimensions;
(b) at least one magnetizing coil being coupled to the poles for magnetizing the poles to apply magnetic force to the probe;
(c) an optical tracker for tracking the position of the magnetic probe in three dimensions;
(d) a three-dimensional motion controller coupled to the optical tracker and the magnetizing coil for measuring an error between a control signal indicative of a desired position and a sensed position signal and for driving the coil to produce a magnetic force on the probe for moving the probe three dimensions to reduce the error;
(e) a light source for generating a beam of light in a direction towards the magnetic probe;
(f) a sensor for sensing light scattered by the probe and direct light generated by the light source;
a plurality of lenses for directing the light scattered by the probe and the direct light generated by the light source to an imaging plane of the sensor;
(h) a position calculator for calculating position of the probe in three dimensions based on the scattered and direct light detected by the sensor;
(i) a stage for supporting the specimen and the probe; and
(j) a controller for controlling position of the stage as the probe is moved.

49. A magnetic coil and pole assembly for controlling motion of a mechanically unattached magnetic probe in three dimensions, the magnetic coil and pole assembly comprising:
(a) n magnetic poles, n being an integer of at least four the poles being geometrically arranged with respect to each other for applying magnetic force in three dimensions to a mechanically unattached magnetic probe and thereby for effecting movement of the probe within a system including a specimen under test in three dimensions;
(b) at least one magnetizing coil being coupled to the poles for magnetizing the poles to apply magnetic force to the probe;
(c) a stage for supporting the specimen and the probe; and
(d) a controller for controlling position of the stage as the probe is moved.

50. A method for three-dimensional motion control and optical tracking of a mechanically unattached magnetic probe, the method comprising:
(a) placing a mechanically unattached magnetic probe in a system including a specimen under test;
(b) tracking position of the probe in three dimensions;
(c) while tracking the position in three dimensions, driving a plurality of magnetic poles to control motion of the probe in three dimensions by reducing error between the tracked position of the probe and a desired position of the probe; and
(d) providing a stage for supporting the specimen and the probe and a controller for controlling position of the stage as the probe is moved.

51. A method for three-dimensional motion control and optical tracking of a mechanically unattached magnetic probe, the method comprising:
(a) placing a mechanically unattached magnetic probe in a specimen under test;
(b) tracking position of the probe in three dimensions;
(c) while tracking the position in three dimensions, driving a plurality of magnetic poles to control motion of the probe in three dimensions by reducing error between the tracked position of the probe and a desired position of the probe, wherein placing a mechanically unattached magnetic probe in a specimen under test includes placing the probe inside of a biological system, and wherein placing the probe inside of a biological system includes placing the probe inside of a living cell; and
(d) providing a stage for supporting the specimen and the probe and a controller for controlling position of the stage as the probe is moved.

52. A method for three-dimensional motion control and optical tracking of a mechanically unattached magnetic probe, the method comprising:
(a) placing a mechanically unattached magnetic probe in a system including a specimen under test;
(b) tracking position of the probe in three dimensions;
(c) while tracking the position in three dimensions, driving a plurality of magnetic poles to control motion of the probe in three dimensions by reducing error between the tracked position of the probe and a desired position of the probe; and
(d) providing a stage for supporting the specimen and the probe and a controller for controlling position of the stage as the probe is moved.

* * * * *